United States Patent
Neelannavar et al.

(10) Patent No.: US 12,524,297 B2
(45) Date of Patent: Jan. 13, 2026

(54) READ RECOVERY WITH TIME LIMIT IN NONVOLATILE MEMORY

(71) Applicant: Sandisk Technologies, Inc., Milpitas, CA (US)

(72) Inventors: Savita Neelannavar, Bangalore (IN); Shiv Kumar Gupta, Bangalore (IN); Akshay Ravindra, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 38 days.

(21) Appl. No.: 18/490,782

(22) Filed: Oct. 20, 2023

(65) Prior Publication Data
US 2025/0130887 A1   Apr. 24, 2025

(51) Int. Cl.
G06F 11/00     (2006.01)
G06F 11/10     (2006.01)

(52) U.S. Cl.
CPC .................. *G06F 11/10* (2013.01)

(58) Field of Classification Search
None
See application file for complete search history.

(56) References Cited

U.S. PATENT DOCUMENTS

| | | |
|---|---|---|
| 9,830,093 B2 | 11/2017 | Guo et al. |
| 9,996,285 B2 | 6/2018 | Kang et al. |
| 10,521,304 B1 * | 12/2019 | Reddy .................. G06F 3/0619 |
| 11,321,173 B2 | 5/2022 | Luo et al. |
| 11,461,260 B2 | 10/2022 | Pinto et al. |
| 11,500,569 B2 | 11/2022 | Markus et al. |
| 11,520,491 B2 | 12/2022 | Luo et al. |
| 11,521,690 B2 | 12/2022 | Manganelli et al. |
| 11,960,359 B2 * | 4/2024 | Lee ........................ G06F 11/076 |
| 11,989,089 B2 * | 5/2024 | Park ..................... G06F 11/1048 |
| 2018/0189140 A1 * | 7/2018 | Motwani .............. H03M 13/116 |
| 2020/0301780 A1 * | 9/2020 | Kim ........................ G11C 5/143 |

\* cited by examiner

*Primary Examiner* — Mujtaba M Chaudry
(74) *Attorney, Agent, or Firm* — Pearl Cohen Zedek Latzer Baratz LLP

(57) ABSTRACT

A data storage system includes control circuits configured to connect to nonvolatile memory cells and to a host. The control circuits are configured to perform a first data recovery operation in response to reading uncorrectable data from the nonvolatile memory cells. The control circuits are configured to inform the host, within a time limit for responding to a host read command from the host, of the failure of the first data recovery operation and availability of a second data recovery operation.

19 Claims, 18 Drawing Sheets

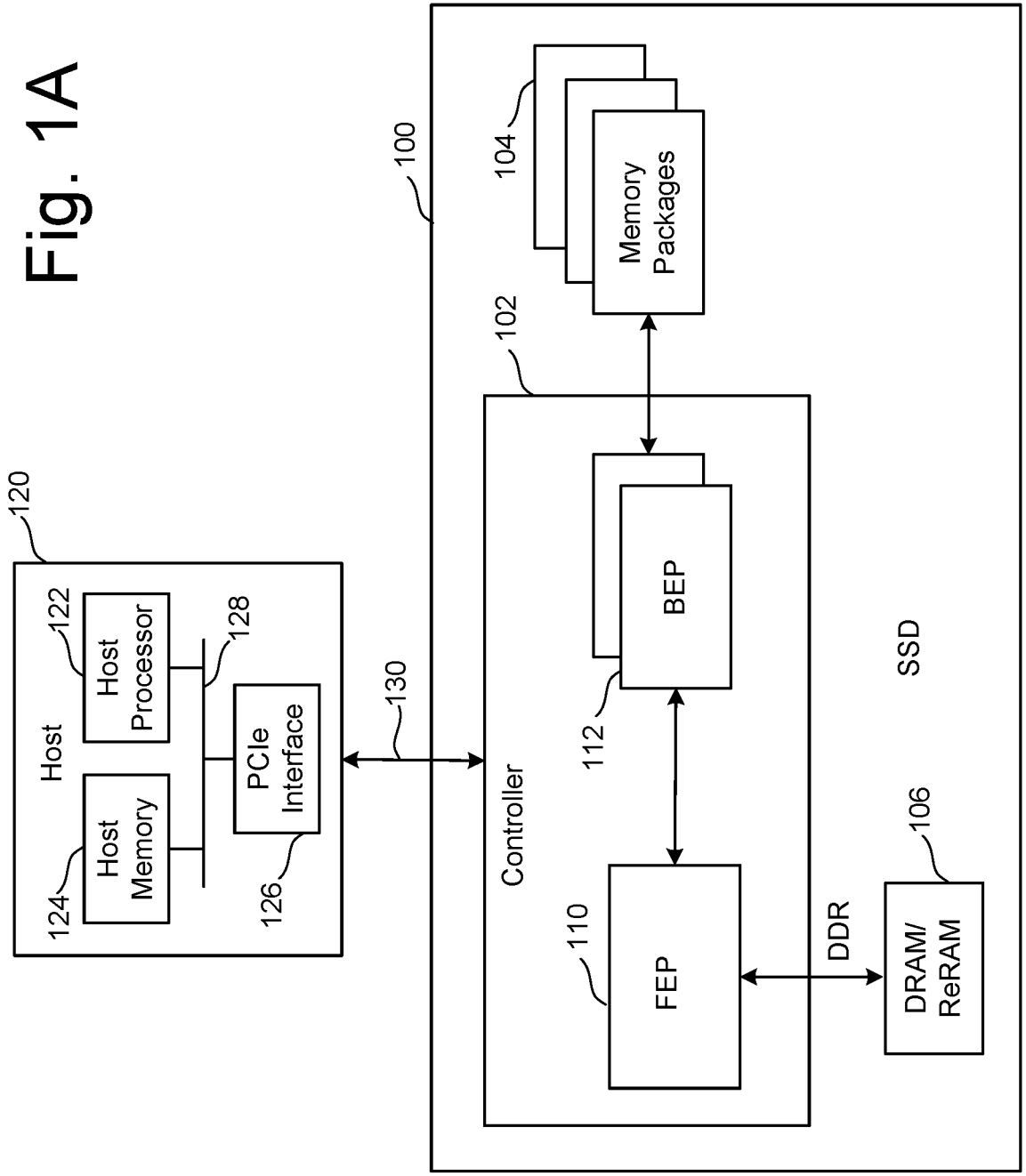

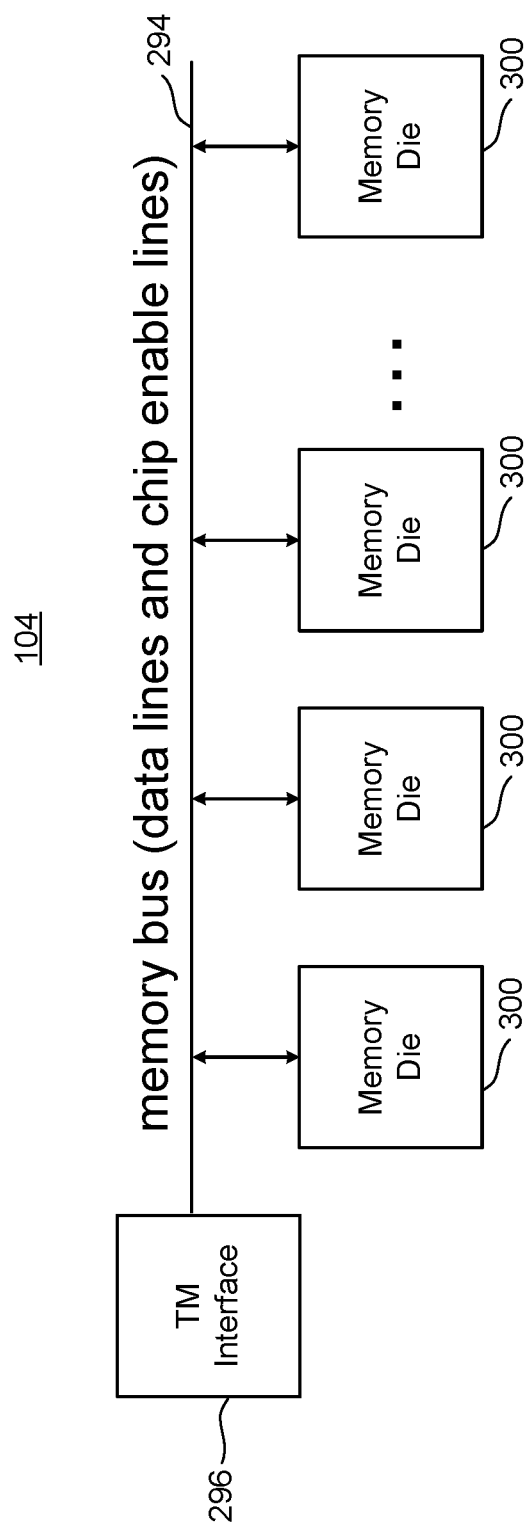

READ RECOVERY WITH TIME LIMIT IN NONVOLATILE MEMORY

BACKGROUND

The present technology relates to nonvolatile memories and to reading data that is stored in such memories.

Semiconductor memory devices have become more popular for use in various electronic devices. For example, non-volatile semiconductor memory is used in cellular telephones, digital cameras, personal digital assistants, mobile computing devices, non-mobile computing devices and other devices (host devices).

A memory device includes memory cells, which may be arranged in series, in NAND strings, for instance, where select gate transistors are provided at the ends of the NAND string to selectively connect a channel of the NAND string to a source line or bit line.

A charge-storing material such as a floating gate or a charge-trapping material can be used in such memory devices to store a charge which represents a data state. A charge-trapping material can be arranged vertically in a three-dimensional (3D) stacked memory structure, or horizontally in a two-dimensional (2D) memory structure. One example of a 3D memory structure is the Bit Cost Scalable (BiCS) architecture which comprises a stack of alternating conductive and dielectric layers.

A host and a memory device may communicate according to an interface standard. In some cases, certain memory device operations (e.g., read operations) may have a time limit (e.g., imposed by an interface standard). When data has a high error rate, recovering the data within a specified time limit may be challenging.

BRIEF DESCRIPTION OF THE DRAWINGS

Like-numbered elements refer to common components in the different Figures.

FIG. 1A is a block diagram of one embodiment of a memory system connected to a host.

FIG. 1D is a block diagram of one embodiment of a memory package.

DETAILED DESCRIPTION

Figure 1B:
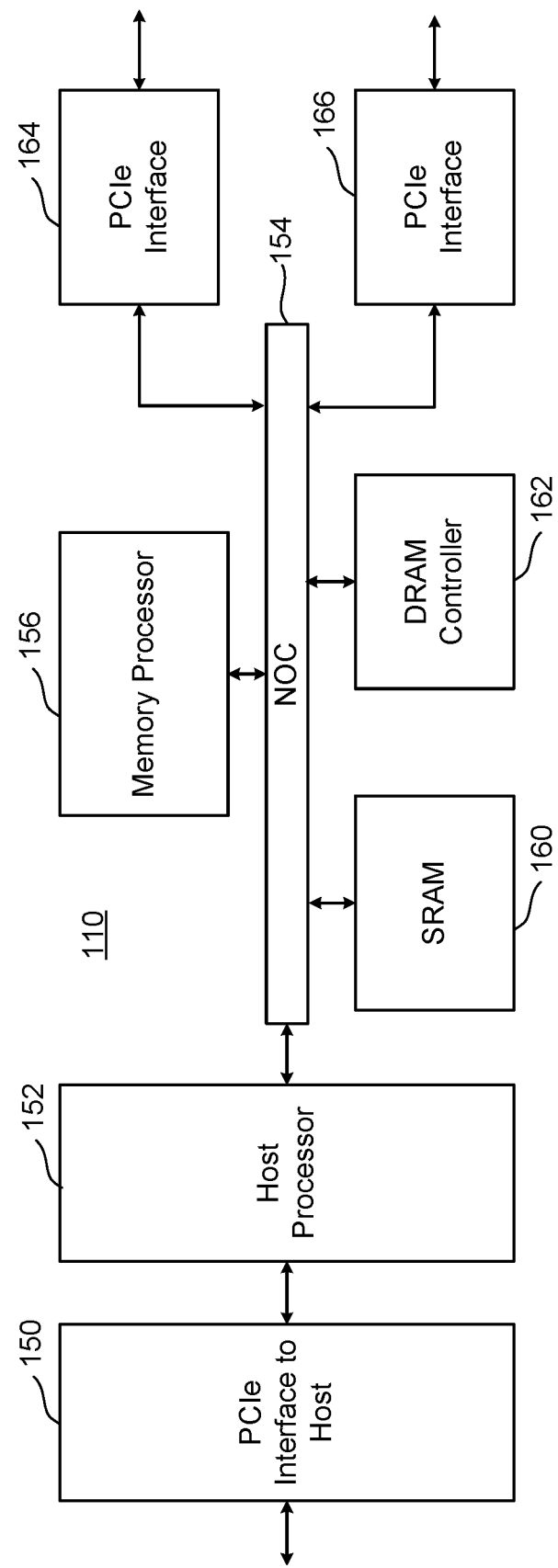
FIG. 1B is a block diagram of one embodiment of a Front-End Processor Circuit. In some embodiments, the Front-End Processor Circuit is part of a Controller.

Techniques are disclosed herein to enable a memory system to perform data recovery effectively when the memory system encounters uncorrectable data and is subject to a time limit for responding to a read command.

While multiple (two or more) data recovery operations and/or lengthy data recovery operations may be performed in some memory systems, the time for multiple and/or lengthy recovery operations may exceed a time limit for performing a read operation (e.g., a memory system may be required to respond to a host read command within a time limit). Failing to recover data and provide it to the host is undesirable.

Aspects of the present technology enable a memory system to respond to a read command, within the time limit for the read command, to inform the host that a first data recovery operation is not successful. The host may then send a second read command for the same data and in response, the memory system may perform a second data recovery operation and respond to the host within the time limit for the second read command. If additional time is needed for the second data recovery operation, the memory system may pause the second data recovery operation, inform the host within the time limit for the second read command and the host may send a third read command to allow more time (e.g., third read command sets new time for responding). In response, the memory system may unpause the second data recovery operation. The host may extend the time allowed for recovery in this way by sending additional read commands (e.g., fourth read command, fifth read command, etc.) in order to recover the data.

FIG. 1A is a block diagram of one embodiment of a memory system 100 (data storage system) connected to a host 120. Memory system 100 can be configured to implement aspects of the technology proposed herein. Many different types of memory systems can be used with the technology proposed herein. One example memory system is a solid-state drive ("SSD"); another is a memory card; however, other types of memory systems can also be used. Memory system 100 comprises a Controller 102, nonvolatile memory 104 for storing data, and local memory (e.g., DRAM/ReRAM) 106. Controller 102 comprises a Front-End Processor Circuit (FEP) 110 and one or more Back End Processor Circuits (BEP) 112. In one embodiment FEP circuit 110 is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP 110 and BEP 112 both include their own processors. In one embodiment, FEP circuit 110 and BEP 112 work as a master slave configuration where the FEP circuit 110 is the master, and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other nonvolatile data storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Controller 102 is one example of a control circuit.

In one embodiment, nonvolatile memory 104 comprises a plurality of memory packages. Each memory package includes one or more memory die. Therefore, Controller 102 is connected to one or more nonvolatile memory die. In one embodiment, each memory die in the memory packages 104 utilize NAND flash memory (including two-dimensional NAND flash memory and/or three-dimensional NAND flash memory). In other embodiments, the memory package can include other types of memory.

Controller 102 communicates with host 120 via an interface 130. For example, interface 130 may be configured according to a standard such as the Secure Digital (SD) standard and/or the NonVolatile Memory express (NVMe) standard (e.g., using PCI Express (PCIe)). For working with memory system 100, host 120 includes a host processor 122, host memory 124, and in this example a PCIe interface 126 connected to bus 128. Host memory 124 is the host's physical memory, and can be DRAM, SRAM, nonvolatile memory or another type of storage. Host 120 is external to and separate from memory system 100. In one embodiment, memory system 100 is embedded in host 120.

In some cases, a data storage system (e.g., memory system 100) may support communication with hosts that use two or more different interface standards in order to be compatible with a wide range of hosts (e.g., backward compatible). Such a dual interface data storage system (or multi-mode system) may have circuits configured to comply with two or more standards. For example, a memory system (e.g., SD express) may be configured to communicate via the NVMe standard as shown in FIG. 1A and may also be configurable to communicate with a host using an SD interface (e.g., an interface that complies with the SD interface specification). This may allow a memory system to be compatible with a wide range of hosts.

FIG. 1B is a block diagram of one embodiment of FEP circuit 110. FIG. 1B shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

Figure 1C:
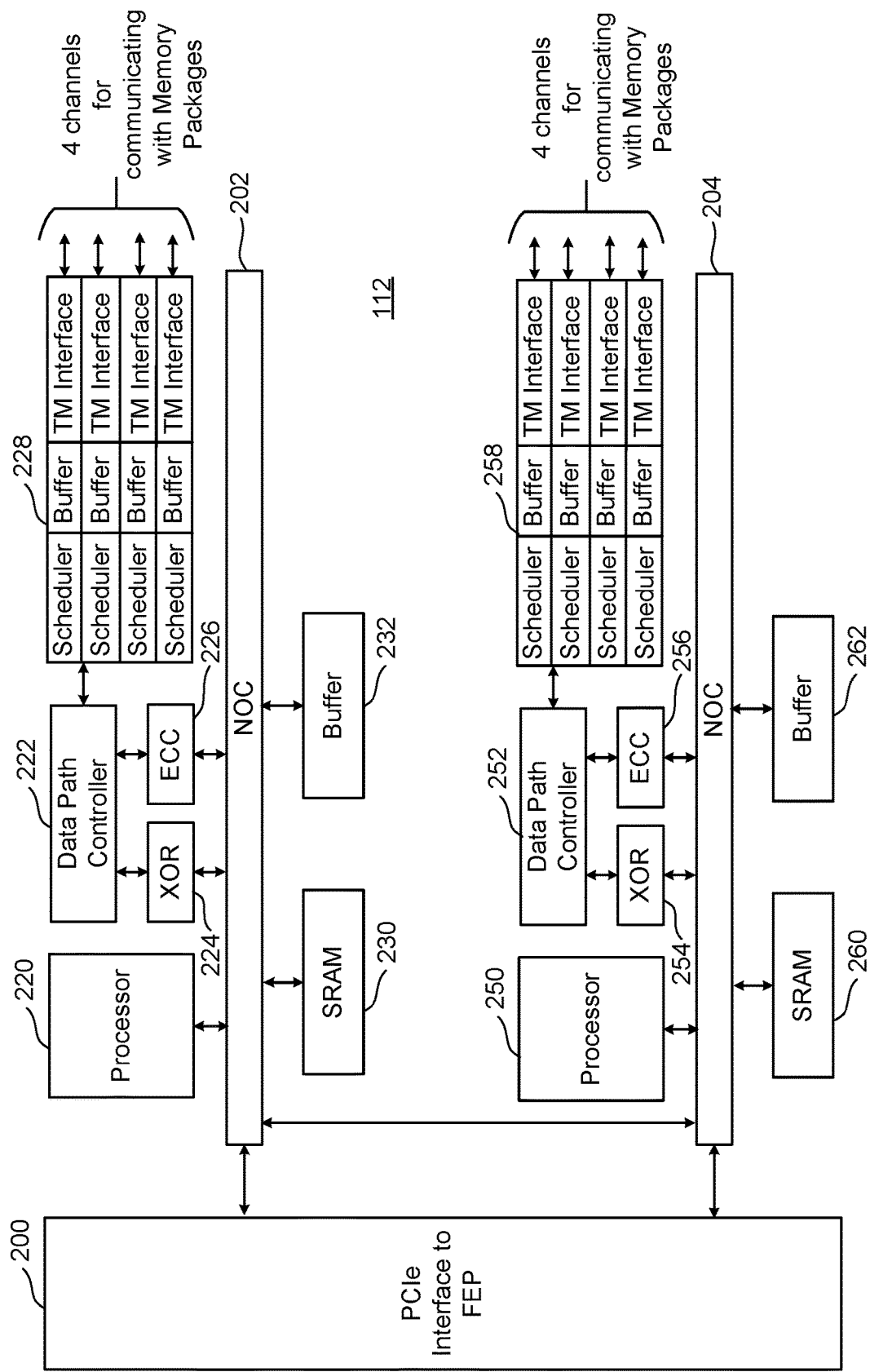
FIG. 1C is a block diagram of one embodiment of a Back End Processor Circuit. In some embodiments, the Back End Processor Circuit is part of a Controller.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming or read error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

FIG. 1D is a block diagram of one embodiment of a memory package 104 that includes a plurality of memory die 300 connected to a memory bus 294 (data lines and chip enable lines). The memory bus 294 connects to a Toggle Mode Interface 296 for communicating with the TM Interface of a BEP circuit 112 (see e.g., FIG. 1C). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 2A:
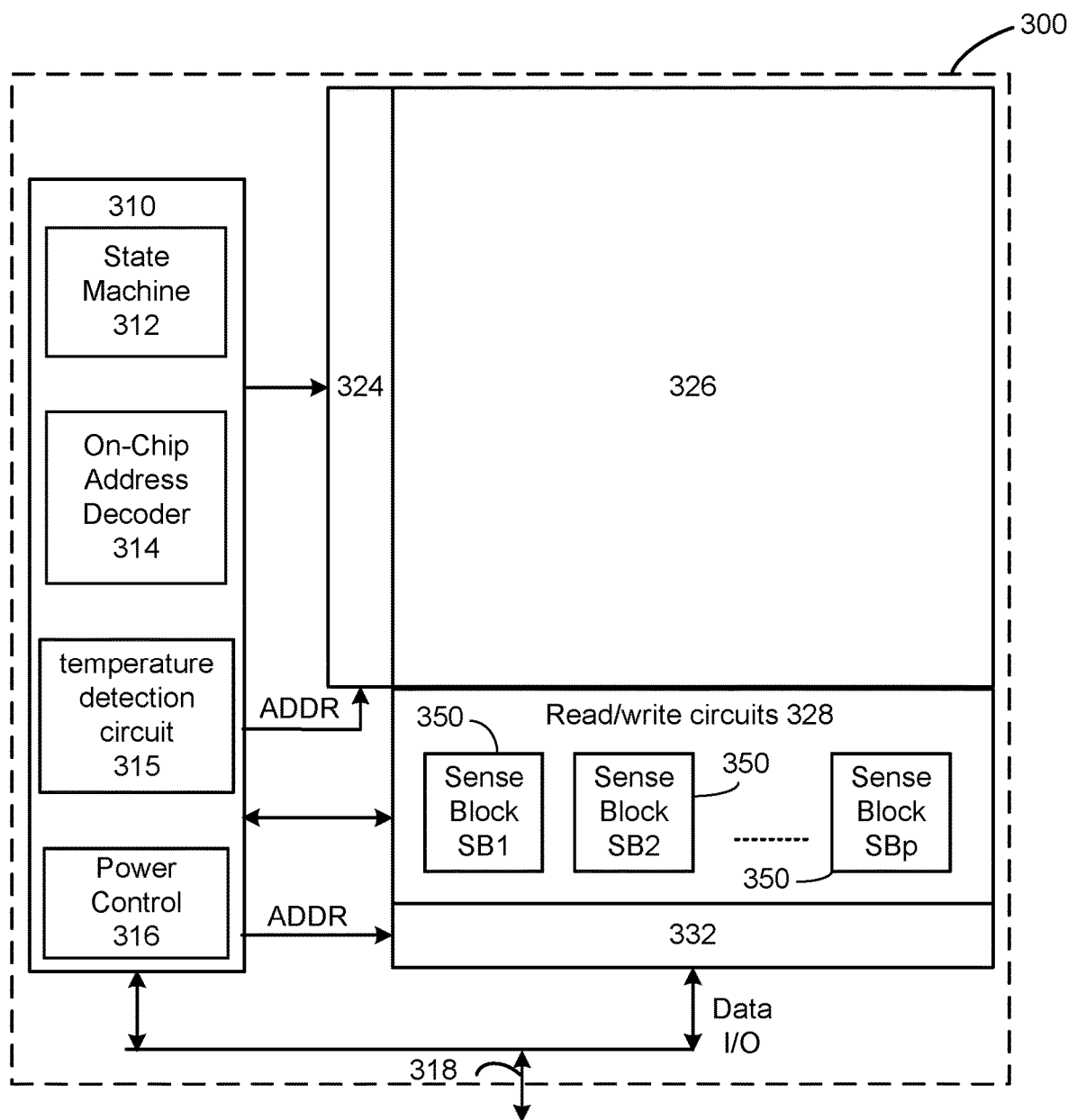
FIG. 2A is a functional block diagram of an embodiment of a memory die.

FIG. 2A is a functional block diagram of one embodiment of a memory die 300. Each of the one or more memory die 300 of FIG. 1D can be implemented as memory die 300 of FIG. 2A. The components depicted in FIG. 2A are electrical circuits. In one embodiment, each memory die 300 includes a memory structure 326, control circuits 310, and read/write circuits 328, all of which are electrical circuits. Memory structure 326 is addressable by word lines via a row decoder 324 and by bit lines via a column decoder 332. The read/write circuits 328 include multiple sense blocks 350 including SB1, SB2, . . . , SBp (sensing circuits) and allow a page (or multiple pages) of data in multiple memory cells to be read or programmed in parallel. In one embodiment, each sense block includes a sense amplifier and a set of latches connected to the bit line. The latches store data to be written and/or data that has been read. The sense blocks include bit line drivers.

Commands and data are transferred between the controller and the memory die 300 via lines 318, which may form a bus between memory die 300 and the controller (e.g., memory bus 294). In one embodiment, memory die 300 includes a set of input and/or output (I/O) pins that connect to lines 318.

Control circuits 310 cooperate with the read/write circuits 328 to perform memory operations (e.g., write, read, erase, and others) on memory structure 326. In one embodiment, control circuits 310 includes a state machine 312, an on-chip address decoder 314, a power control module 316 (power control circuit) and a temperature detection circuit 315. State machine 312 provides die-level control of memory operations. In one embodiment, state machine 312 is programmable by software. In other embodiments, state machine 312 does not use software and is completely implemented in hardware (e.g., electrical circuits). In some embodiments, state machine 312 can be replaced by a microcontroller or microprocessor. In one embodiment, control circuits 310 include buffers such as registers, ROM fuses and other storage devices for storing default values such as base voltages and other parameters.

The on-chip address decoder 314 provides an address interface between addresses used by controller 102 to the hardware address used by the decoders 324 and 332 (e.g., logical-to-physical address translation). Power control module 316 controls the power and voltages supplied to the word lines and bit lines during memory operations. Power control module 316 may include charge pumps for creating voltages.

For purposes of this document, control circuits 310, alone or in combination with read/write circuits 328 and decoders 324/332, comprise one or more control circuits for memory structure 326. These one or more control circuits are electrical circuits that perform the functions described below in the flow charts and signal diagrams. In other embodiments, the one or more control circuits can consist only of controller 102, which is an electrical circuit in combination with software, that performs the functions described below in the flow charts and signal diagrams. In another alternative, the one or more control circuits comprise controller 102 and control circuits 310 performing the functions described below in the flow charts and signal diagrams. In another embodiment, the one or more control circuits comprise state machine 312 (or a microcontroller or microprocessor) alone or in combination with controller 102.

In one embodiment, memory structure 326 comprises a monolithic three-dimensional memory array of nonvolatile memory cells in which multiple memory levels are formed above a single substrate, such as a wafer. The memory structure may comprise any type of nonvolatile memory that is monolithically formed in one or more physical levels of arrays of memory cells having an active area disposed above a silicon (or other type of) substrate. In one example, the nonvolatile memory cells of memory structure 326 comprise vertical NAND strings with charge-trapping material such as described, for example, in U.S. Pat. No. 9,721,662, incorporated herein by reference in its entirety. In another embodiment, memory structure 326 comprises a two-dimensional memory array of nonvolatile memory cells. In one example, the nonvolatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

In one embodiment, the control circuit(s) (e.g., control circuits 310) are formed on a first die, referred to as a control die, and the memory array (e.g., memory structure 326) is formed on a second die, referred to as a memory die. For example, some or all control circuits (e.g., control circuit 310, row decoder 324, column decoder 332, and read/write circuits 328) associated with a memory may be formed on the same control die. A control die may be bonded to one or more corresponding memory die to form an integrated memory assembly. The control die and the memory die may have bond pads arranged for electrical connection to each other. Bond pads of the control die and the memory die may be aligned and bonded together by any of a variety of bonding techniques, depending in part on bond pad size and bond pad spacing (i.e., bond pad pitch). In some embodiments, the bond pads are bonded directly to each other, without solder or other added material, in a so-called Cu-to-Cu bonding process. In some examples, dies are bonded in a one-to-one arrangement (e.g., one control die to one memory die). In some examples, there may be more than one control die and/or more than one memory die in an integrated memory assembly. In some embodiments, an integrated memory assembly includes a stack of multiple control die and/or multiple memory die. In some embodiments, the control die is connected to, or otherwise in communication with, a memory controller. For example, a memory controller may receive data to be programmed into a memory array. The memory controller will forward that data to the control die so that the control die can program that data into the memory array on the memory die.

Figure 2B:
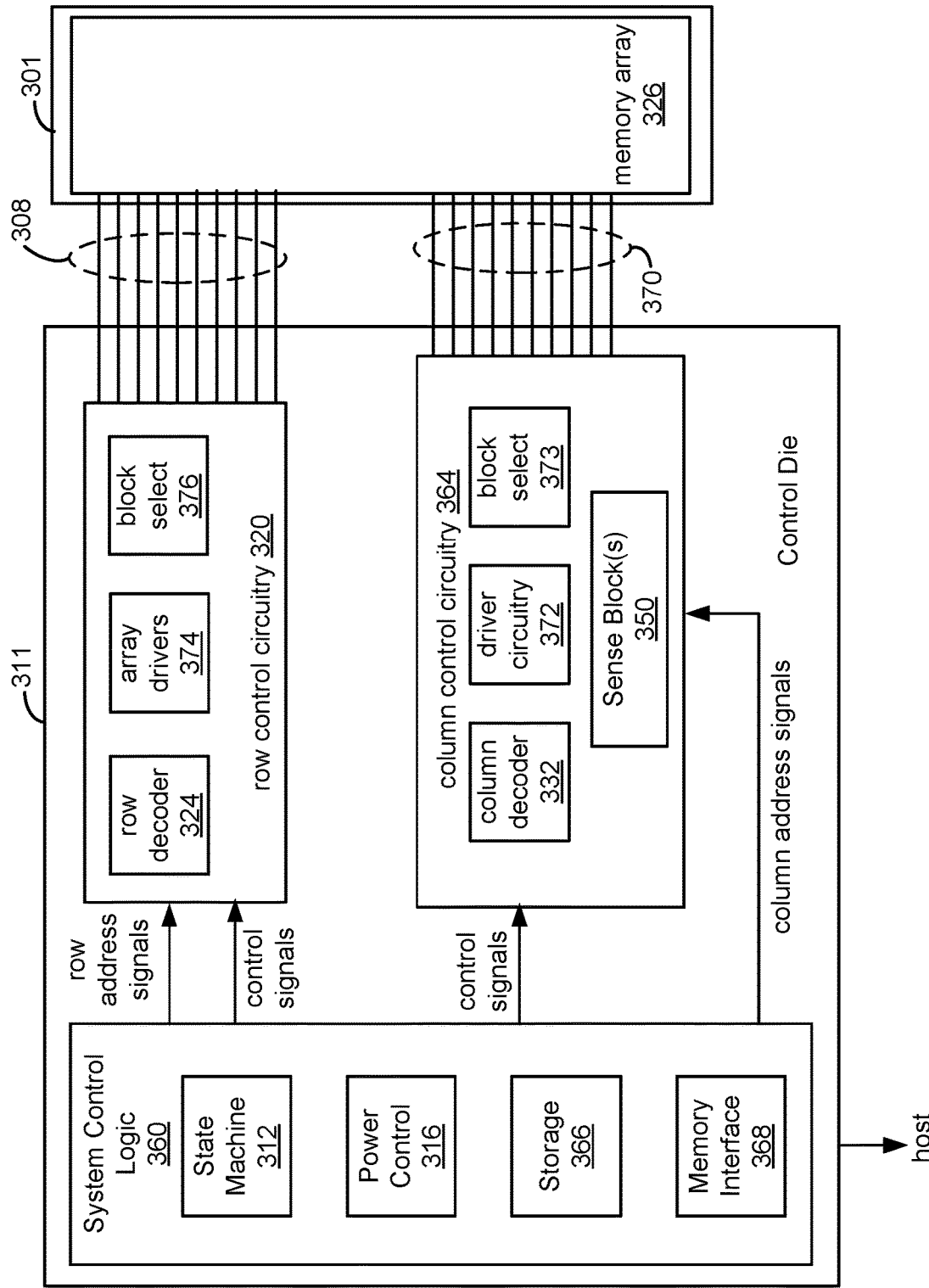
FIG. 2B is a functional block diagram of an embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 307. One or more integrated memory assemblies 307 may be used in a memory package 104 in memory system 100. The integrated memory assembly 307 includes two types of semiconductor die (or more succinctly, "die"). Memory die 301 includes memory array 326 (memory structure). Memory array 326 may contain nonvolatile memory cells.

Control die 311 includes column control circuitry 364, row control circuitry 320 and system control logic 360 (including state machine 312, power control module 316, storage 366, and memory interface 368). In some embodiments, control die 311 is configured to connect to the memory array 326 in the memory die 301. FIG. 2B shows an example of the peripheral circuitry, including control circuits, formed in a peripheral circuit or control die 311 coupled to memory array 326 formed in memory die 301. System control logic 360, row control circuitry 320, and column control circuitry 364 are located in control die 311. In some embodiments, all or a portion of the column control circuitry 364 and all or a portion of the row control circuitry 320 are located on the memory die 301. In some embodiments, some of the circuitry in the system control logic 360 is located on the on the memory die 301.

System control logic 360, row control circuitry 320, and column control circuitry 364 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 364). Thus, while moving such circuits from a die such as memory die 301 may reduce the number of steps needed to fabricate such a die, adding such circuits to a die such as control die 311 may not require many additional process steps.

FIG. 2B shows column control circuitry 364 including sense block(s) 350 on the control die 311 coupled to memory array 326 on the memory die 301 through electrical paths 370. For example, electrical paths 370 may provide electrical connection between column decoder 332, driver circuitry 372, and block select 373 and bit lines of memory array (or memory structure) 326. Electrical paths may extend from column control circuitry 364 in control die 311 through pads on control die 311 that are bonded to corresponding pads of the memory die 301, which are connected to bit lines of memory structure 326. Each bit line of memory structure 326 may have a corresponding electrical path in electrical paths 370, including a pair of bond pads, which connects to column control circuitry 364. Similarly, row control circuitry 320, including row decoder 324, array drivers 374, and block select 376 are coupled to memory array 326 through electrical paths 308. Each of electrical paths 308 may correspond to a word line, dummy word line, or select gate line. Additional electrical paths may also be provided between control die 311 and memory structure die 301.

In some embodiments, there is more than one control die 311 and/or more than one memory die 301 in an integrated memory assembly 307. In some embodiments, the integrated memory assembly 307 includes a stack of multiple control die 311 and multiple memory structure die 301. In some embodiments, each control die 311 is affixed (e.g., bonded) to at least one of the memory structure dies 301.

The exact type of memory array architecture or memory cell included in memory structure 326 is not limited to the examples above. Many different types of memory array architectures or memory cell technologies can be used to form memory structure 326. No particular nonvolatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for architectures of memory structure 326 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
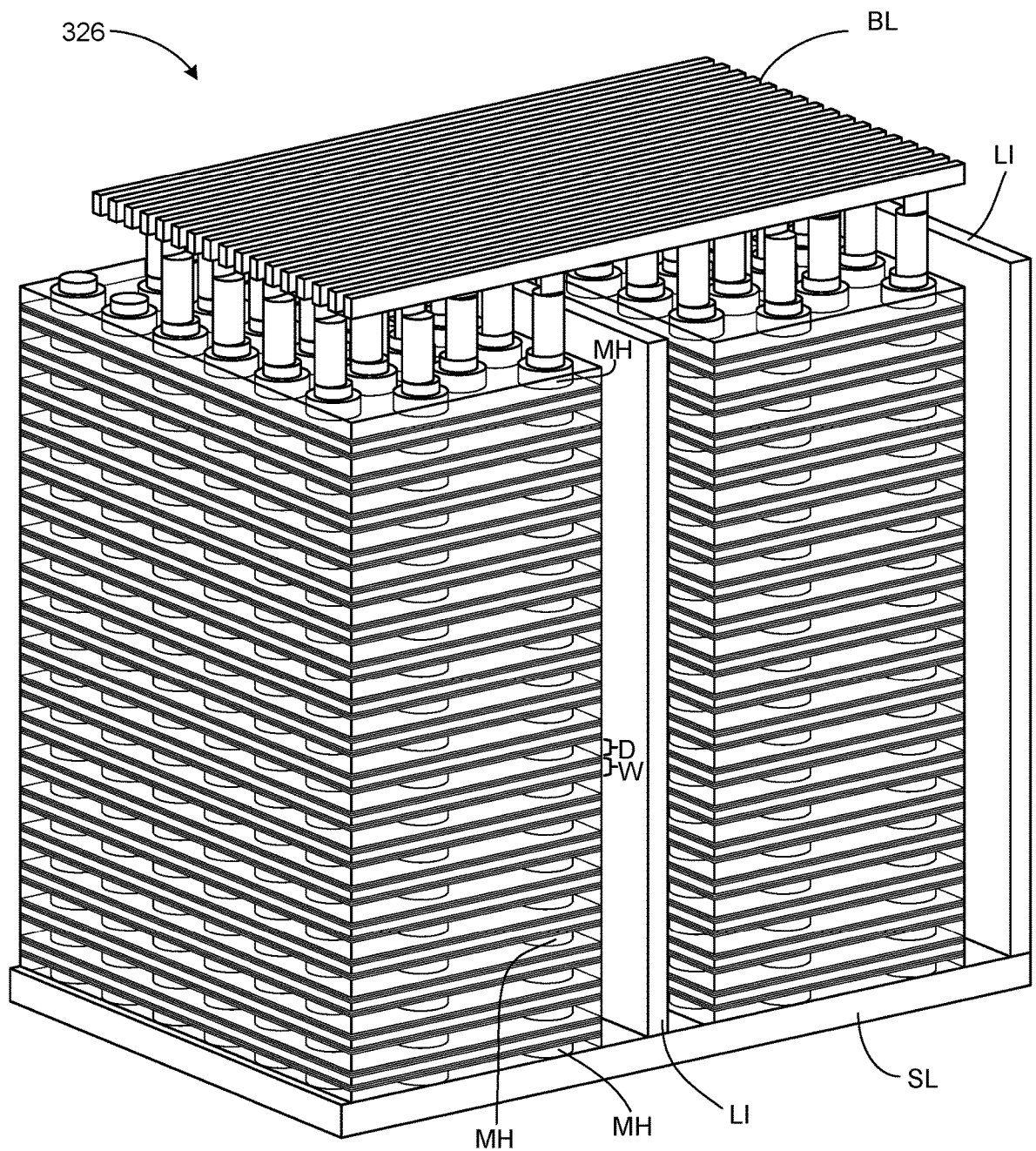
FIG. 3 is a perspective view of a portion of one embodiment of a monolithic three-dimensional memory structure.

FIG. 3 is a perspective view of a portion of one example embodiment of a monolithic three-dimensional memory array that can comprise memory structure 326, which includes a plurality memory cells. For example, FIG. 3 shows a portion of one block of memory. The structure depicted includes a set of bit lines BL positioned above a stack of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-278 alternating dielectric layers and conductive layers, for example, 127 data word line layers, 8 select layers, 4 dummy word line layers and 139 dielectric layers.

More or fewer than 108-278 layers can also be used. As will be explained below, the alternating dielectric layers and conductive layers are divided into four "fingers" by local interconnects LI. FIG. 3 shows two fingers and two local interconnects LI. Below the alternating dielectric layers and word line layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data. More details of the three-dimensional monolithic memory array that comprises memory structure 326 is provided below with respect to FIG. 4A-4C.

A memory system (e.g., memory system 100) may communicate with a host according to a host interface protocol that is specified by an interface standard. Some memory systems may be configured to communicate via only one interface protocol and may only be compatible with hosts that use the same interface protocol. Other memory systems may be configured to communicate via two or more interface protocols and may be compatible with hosts that use any one of the two or more interface protocols. When a memory system is connected to a host, an initialization routine may be used to establish the interface protocol to be used and to configure the host and/or memory system accordingly. Subsequent communication between the host and the memory system may comply with the interface protocol, which may impose different requirements according to the interface protocol (e.g., different time limits or other limits).

Figure 4:
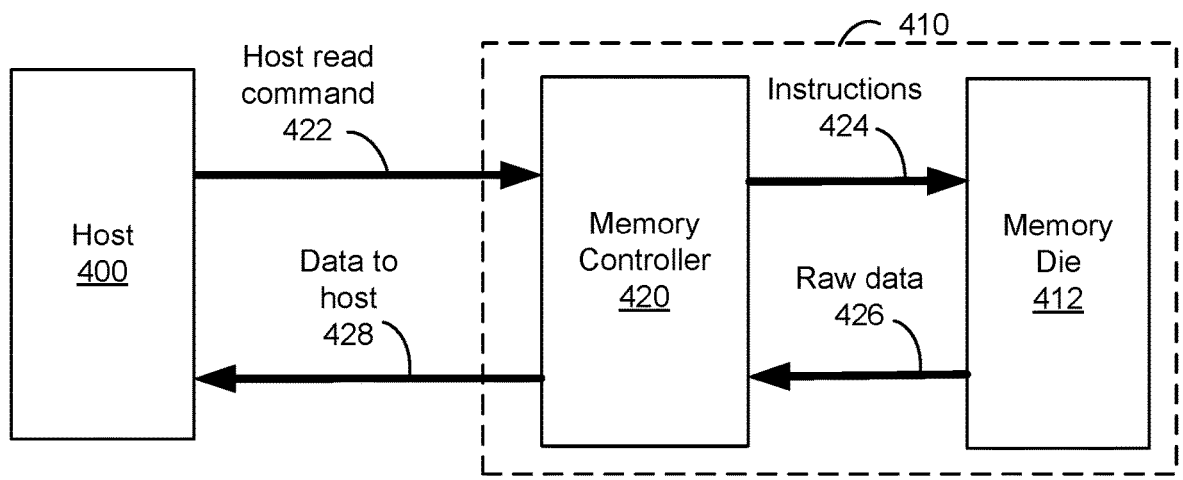
FIG. 4 shows an example of a host read.

FIG. 4 shows an example of a host 400 (e.g., host 120 or other host) in communication with a memory system 410. Memory system 410 includes nonvolatile memory die 412, which includes a nonvolatile memory array (e.g., memory array 326). While a single memory die 412 is shown in FIG. 4 for simplicity of illustration, two or more nonvolatile memory dies may be provided in other examples (e.g., as previously described). Memory die 412 may be implemented similarly to memory die 300 (having on-chip control circuits) or similarly to integrated memory assembly 307 (having control circuits on a control die that is bonded to a memory array die) or using a combination of control circuits on a memory die and on another die. Memory system 410 also includes memory controller 420, which includes control circuits that are connected to memory die 412. Aspects of the present technology are directed to the configuration of control circuits of a memory controller (e.g., memory controller 420) and/or on a memory die (e.g., on memory die 412). For example, such control circuits may be used to read data from nonvolatile memory cells of memory die 412 in response to a read command from host 400. While memory system 410 is shown in simplified form in FIG. 4, memory system 410 may include some or all of the features previously described with respect to memory system 100 (e.g., memory controller 420 may include features of controller 102 and/or memory die 412 may include features of memory die 300 or integrated memory assembly 307).

FIG. 4 shows host 400 sending a host read command 422 to memory system 410. Memory controller 420 receives host read command 422 and generates one or more instructions 424 to cause reading of data from a corresponding plurality of nonvolatile memory cells of memory die 412. For example, Memory controller 420 may perform logical-to-physical address translation to convert logical addresses received in host read commands to physical addresses in memory die 412 and may then cause appropriate voltages to be applied to the memory cells at the physical addresses (e.g., by controlling voltages applied to word lines and bit lines connected to the memory cells) to initiate read operations. Read operations are performed on the selected nonvolatile memory cells in memory die 412 and the raw data 426 from the read operations are returned to memory controller 420. Memory controller 420 may perform operations on the raw data 426 before sending data to the data 428 to host 400. For example, Error Correction Code (ECC) and/or other techniques may be used to correct the raw data prior to sending the corrected data to the host.

Figure 5:
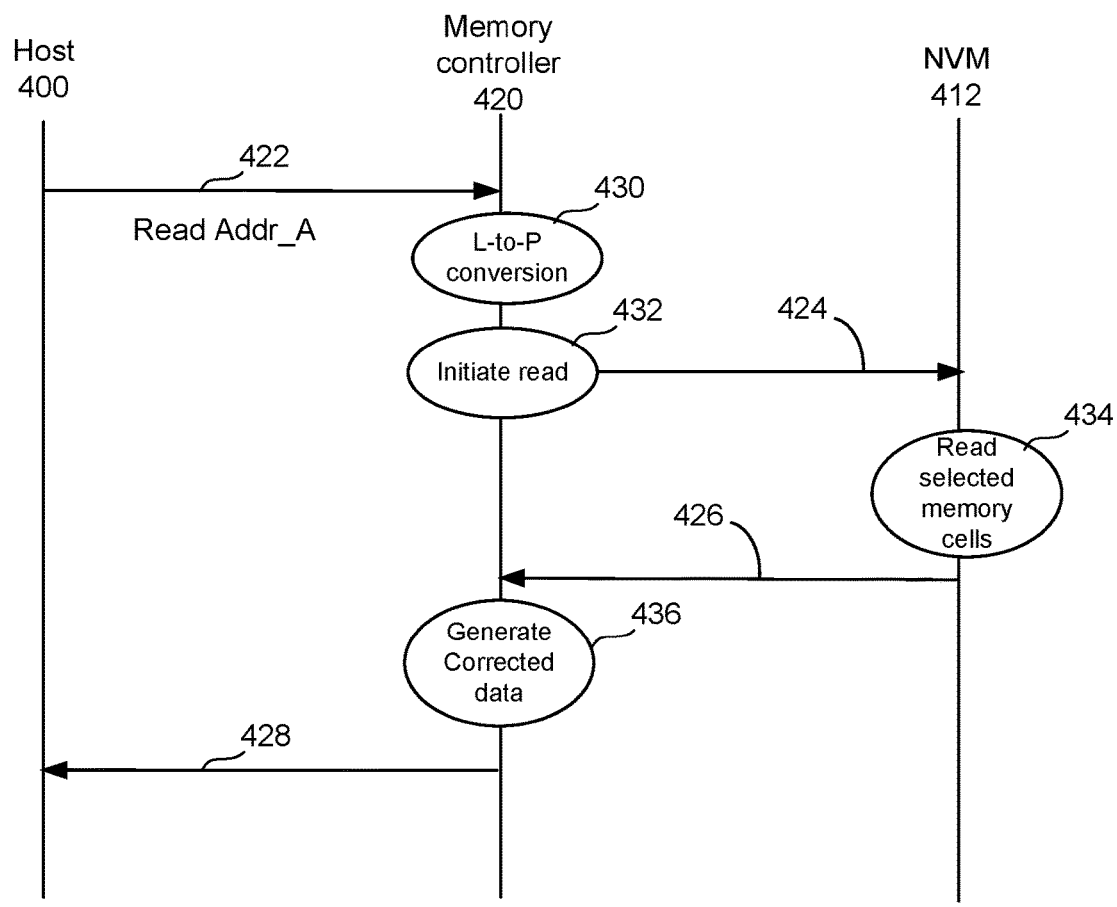
FIG. 5 shows details of an example host read operation.

FIG. 5 illustrates the read operation of FIG. 4 including some of the operations performed by memory controller 420 and memory die (nonvolatile memory or "NVM") 412. Host 400 sends a host read command 422 indicating an address "Addr_A" to read. In response, memory controller 420 performs logical to physical conversion 430 ("L-to-P conversion") to obtain physical addresses for the requested data (e.g., by searching for corresponding entries in a L-to-P conversion table). Memory controller 420 then initiates reading 432 of the physical addresses obtained from logical to physical conversion 430 (e.g., sending instructions 424 to cause the appropriate cells to be selected and appropriate read voltages to be applied). Memory die 412 reads the selected memory cells 434 and sends back raw data 426 to memory controller 420. Memory controller 420 generates corrected data 436 and sends the corrected data 428 to host 400.

Generating corrected data 436 may include various techniques that may take different amounts of time. ECC correction may be used to correct raw data. ECC correction may be sufficient to correct most raw data. If the raw data is initially uncorrectable by ECC then one or more data recovery operations may be performed to attempt to recover the data (e.g., to attempt to obtain data that is correctable by ECC). For example, different read voltages may be used to generate second raw data that may be correctable by ECC. Two or more different sets of read voltages may be applied to attempt to obtain correctable data in a first example of a recovery operation. In some cases, raw data is subject to Exclusive OR (XOR) operations to obtain corrected data in a second example of a recovery operation. However, XOR operations may be time-consuming, which may make XOR correction challenging to implement in some cases. Two or more recovery operations may be performed in series in some cases (e.g., if the first data recovery operation is unsuccessful). For example, when uncorrectable data is encountered, data may be reread using one or more additional set of read voltages to attempt to obtain correctable data and then, if this is unsuccessful, XOR correction may be applied. However, such use of multiple techniques may be time-consuming, which may make using multiple techniques challenging to implement in some cases. While different read voltages and XOR are two examples of data recovery techniques that may be used, other recovery techniques may be used instead of or in addition to either or both of these techniques and the present technology is not limited to the examples described.

In some cases, a response to a host read command is required to be sent within a predetermined time limit (e.g., set by an interface standard). For example, in some cases, memory controller 420 may be required to send a response (e.g., corrected data 428 to the host 400) within a predetermined time from host read command 422 (e.g., the Secure Digital or "SD" standard requires a response within 100 ms). In other examples (e.g., NVMe), a memory controller may respond to read commands that have no/high time limit. When read commands have no time limit (or a high time limit), generating corrected data 436 may include applying multiple correction schemes (e.g., different read voltages followed by XOR) that would take too long to apply within a time limit.

Figure 6A:
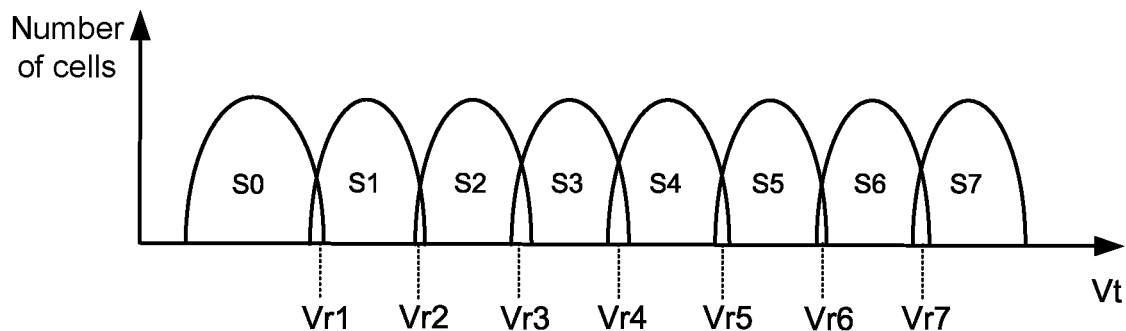
FIGS. 6A-C show an example of a first data recovery operation using different sets of read voltages.
Figure 6B:
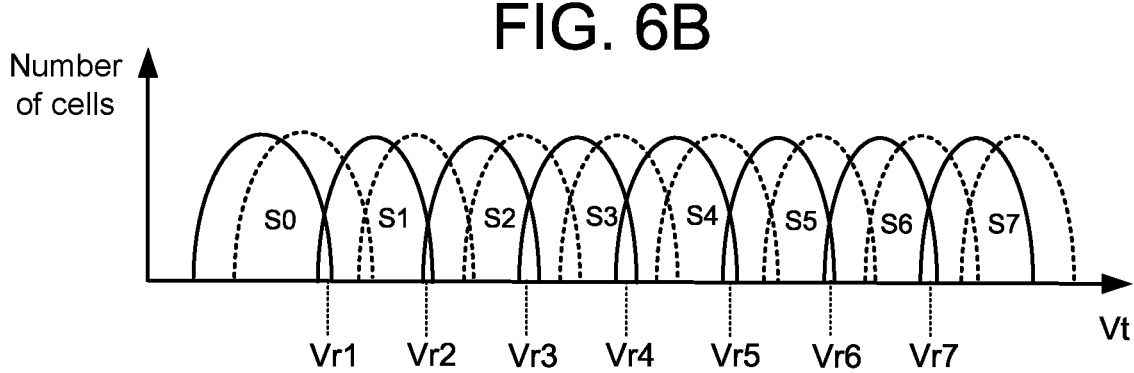
Figure 6C:
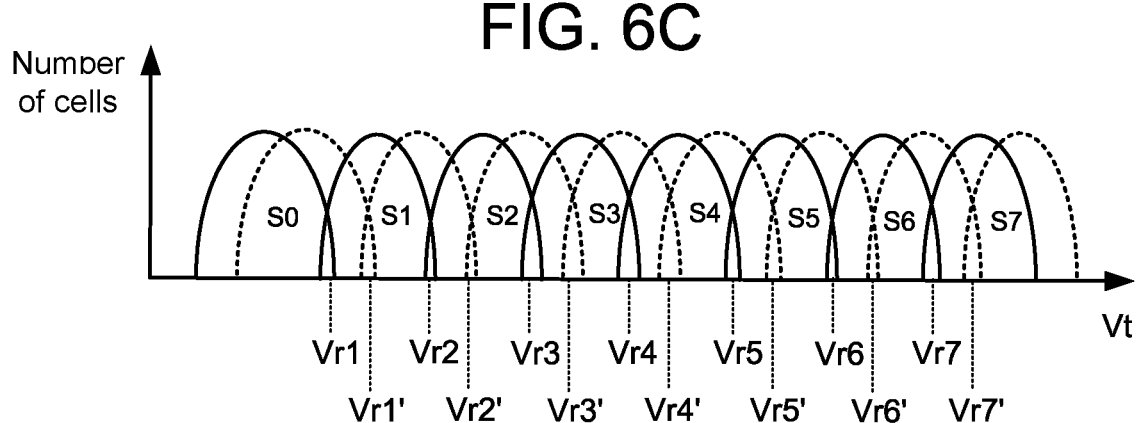

FIGS. 6A-C show an example of a recovery operation that includes changing read voltages. FIG. 6A shows the distributions of threshold voltages (Vt) of a plurality of memory cells that have been programmed. In this example, the memory cells are programmed into eight distributions, S0, S1, S2, S3, S4, S5, S6, S7, corresponding to three bits of data per cell. A read operation is performed using a first set of read voltages Vr1, Vr2, Vr3, Vr4, Vr5, Vr6, Vr7. In this example, the first set of read voltages aligns with the eight distributions shown and reading may be performed successfully (e.g., data may have relatively few errors and be correctable by ECC).

FIG. 6B shows an example in which the distributions of threshold voltages are shifted (increased threshold voltages in this example) with shifted distributions shown by dotted lines. Threshold voltage distributions may shift in either direction (e.g., higher Vt or lower Vt) and may not shift uniformly (e.g., some distributions may shift more than others, some may shift while others do not, some may shift up and others down, some distributions may expand both up and down and so on). When the shifted data of FIG. 6B is read using the first read voltages Vr1-Vr7, the read voltages are not aligned with the shifted distributions, which may result in a large number of errors which may be uncorrectable by ECC.

FIG. 6C shows an example of reading a plurality of memory cells using a second set of read voltages Vr1', Vr2', Vr3', Vr4', Vr5', Vr6', Vr7'. The second set of read voltages are better aligned with the shifted distributions, which results in fewer errors and may provide correctable data. While one additional set of read voltages, Vr1'-Vr7', is shown in this example, two or more additional sets of read voltages (e.g., a third set, fourth set, and so on) may be used in some examples. In some cases, different sets of read voltages are applied according to a scheme (e.g., in a predetermined sequence) until correctable data is obtained or a limit is reached. In some memory systems, when a read operation using a first set of read voltages fails, the same memory cells are reread using at least a second set of read voltages in an example of a first data recovery operation. A memory system may be configured to perform data recovery operations using two or more different sets of read voltages to attempt to obtain correctable data.

Figure 7A:
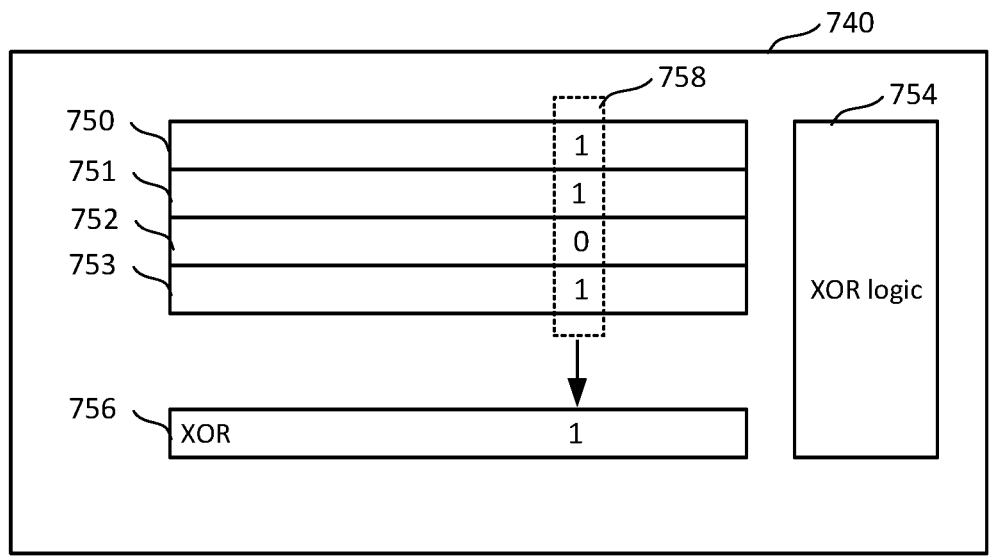
FIGS. 7A-B show an example of a second data recovery operation using Exclusive OR (XOR) operations.
Figure 7B:
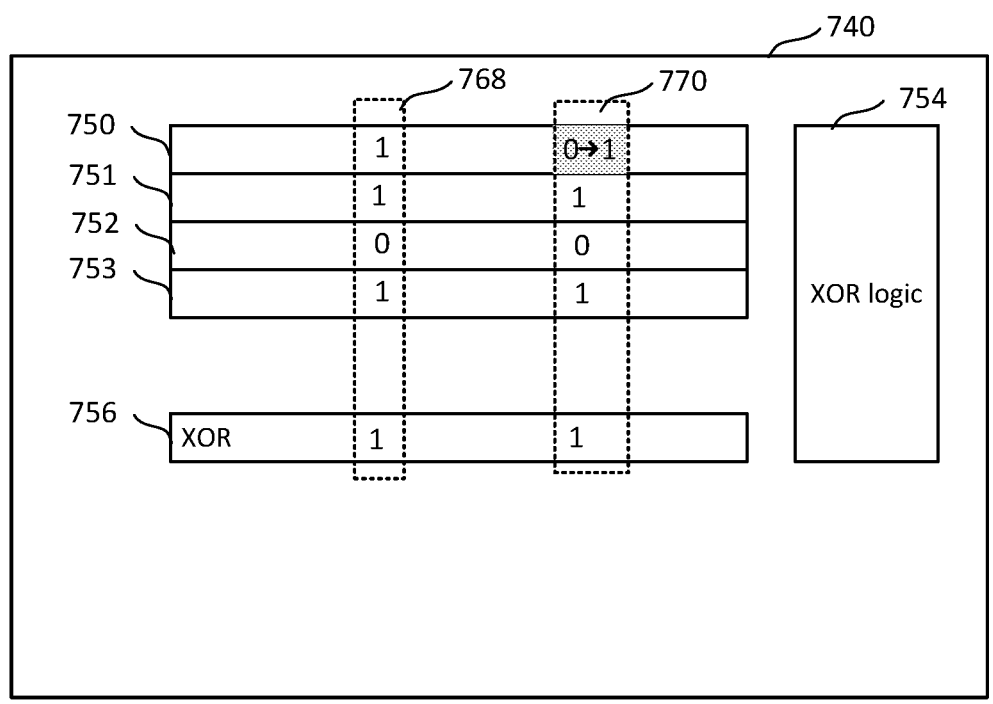

FIG. 7A-B illustrate an example implementation of data recovery using XOR. FIG. 7A shows XOR circuits 740 including XOR logic circuit 754 (e.g., XOR engines 224/254) which is configured to perform an XOR logic operation on data to be stored in memory cells and to generate corresponding bits of XOR data (parity data). In the example shown, four portions of user data 750-751 (additional stored data) are used to calculate a portion of XOR data 756. In other examples, the number of such portions of additional stored data used may be different (e.g., fewer or more than four). XOR data 756 may be stored in memory cells with user data. FIG. 7A shows performing an XOR operation on a set of bits 758. XOR logic circuit 754 calculates a corresponding parity bit (in this case "1") corresponding to bits 1101 of set of bits 758. For example, modulo 2 addition or other technique may be used to generate XOR bits (e.g. where there is an odd number of "1" bits, the XOR result is "1" and when there is an even number of "1" bits, the XOR result is a "0"). Where parity bits are generated in other ways (not XOR) different logic may be applied to generate parity bits. Encoding (calculation of XOR bits in this example) may be performed when data is in temporary storage (e.g., latches, DRAM or XRAM) before programming to nonvolatile memory cells. XOR data may be calculated for some or all user data prior to storage in nonvolatile memory. In an example, user data (e.g., received from a host with a write command) may initially be written in Single Level Cell (SLC) memory in order to maintain a high write speed and low error rate. Subsequently, user data may be moved to Multi-Level Cell (MLC) memory cells where it is stored with high density and may have a higher error rate. XOR data may be calculated when the data is moved to MLC memory cells to provide XOR recovery capability.

FIG. 7B shows an example of error correction using XOR for data recovery (e.g., when a portion of data such as portion 750 is uncorrectable by ECC). XOR logic circuit 754 combines portions of user data 751-753 with XOR data 756 (e.g. XOR data generated by XOR logic circuit 754 prior to programming as shown in FIG. 7A). Portions of data 751-753 and XOR data 756 may be read from nonvolatile memory and corrected by ECC prior to the XOR operation shown and any errors may be assumed to be in portion 750, which is uncorrectable by ECC. In a first example 768, reading a memory cell storing portion 750 generates a "1" and an XOR operation confirms this value (same values as shown in FIG. 7A). In a second example 770, reading another memory cell provides an initial value 0 and an XOR operation indicates that this value is wrong. Bits of portion 750 that are found to be erroneous in this way are flipped (e.g., "0" replaced by "1" or "1" replaced by "0") prior to sending data to the host. Because all bits of portion 750 can be generated from corresponding bits of additional portions 751-753 in combination with XOR data 756, it is not necessary to use portion 750 as-read for recovery (e.g., instead of flipping incorrect bits, all bits of portion 750 may be generated directly from portions 751-753 and XOR data 756). In some cases, XOR data recovery is only used after data recovery using different read voltages fails.

Figure 8:
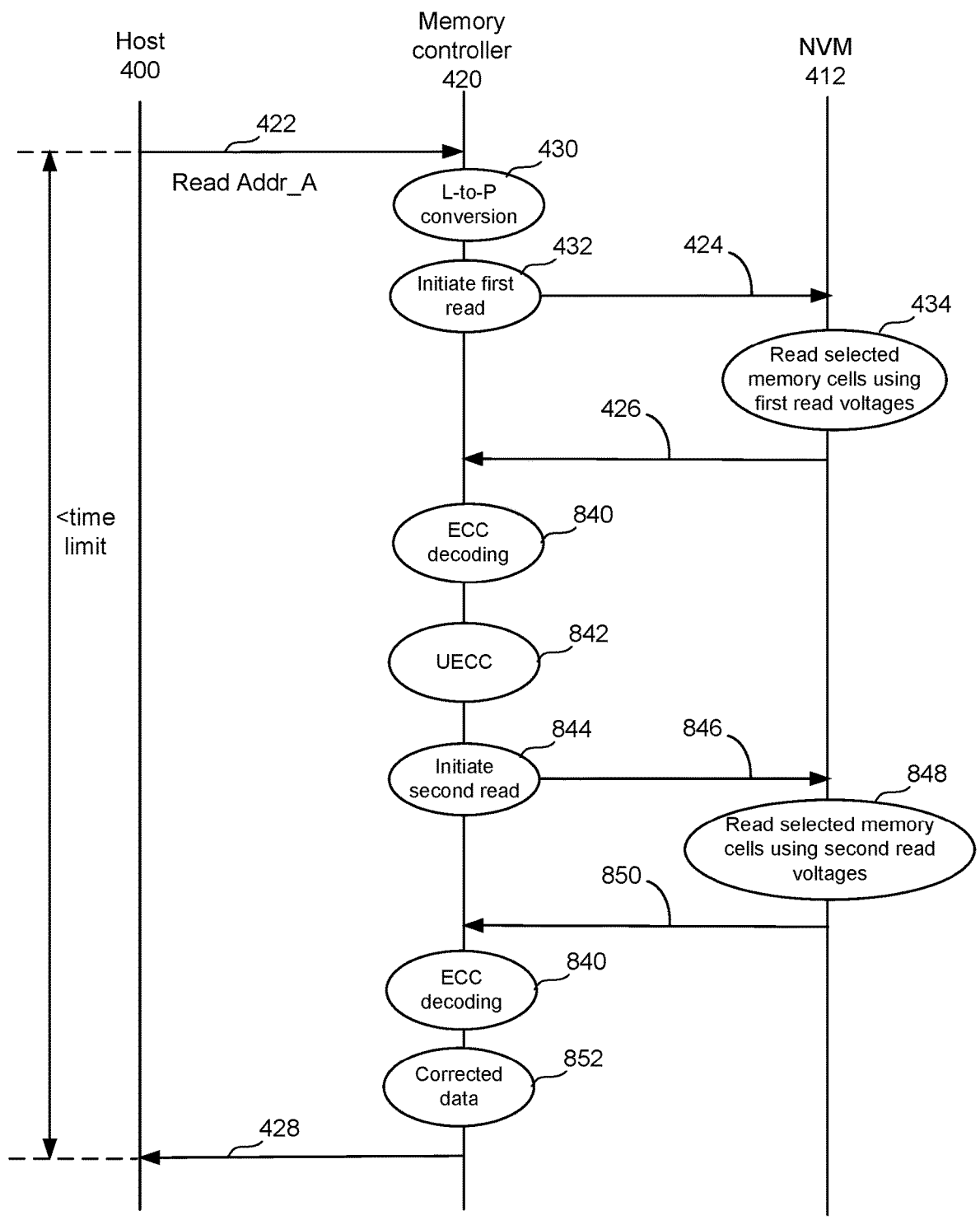
FIG. 8 shows an example of a read operation that includes a first recovery using different read voltages.

FIG. 8 shows an example of data recovery using different read voltages (e.g., as shown in FIGS. 6A-C). Host 400 sends a host read command 422 indicating an address "Addr_A" to read. In response, memory controller 420 performs logical to physical conversion 430 ("L-to-P conversion") to obtain physical addresses for the requested data (e.g., by searching for corresponding entries in a L-to-P conversion table). Memory controller 420 then initiates first read 432 of the physical addresses obtained from logical to physical conversion 430 (e.g., sending instructions 424 to cause the appropriate cells to be selected and appropriate read voltages to be applied). Memory die 412 uses a first set of read voltages to read selected memory cells 434 (e.g., as shown in FIG. 6B) and sends back first raw data 426 to memory controller 420. Memory controller 420 performs ECC decoding 840 and determines that the first raw data is uncorrectable by ECC (e.g., UECC data) 842.

In response to determining that first raw data is UECC data 842, memory controller 420 initiates a second read by sending second read instruction 846 specifying a second set of read voltages to be used. Memory die 412 then reads the selected memory cells using the second read voltages 848 and sends the second raw data 850 to memory controller 420. Memory controller 420 performs ECC decoding 840 on second raw data and obtains corrected data 852 and sends corrected data 428 to host 400. In some examples, additional sets of read voltages may be applied in order to obtain correctable data (e.g., three or more different sets of read voltages).

In some cases, no correctable data may be obtained using different sets of read voltages (e.g., trying a predetermined number of different sets of read voltages). When this recovery method is unsuccessful another (e.g., second) recovery technique may be attempted. For example, an XOR recovery technique may be attempted.

Figure 9:
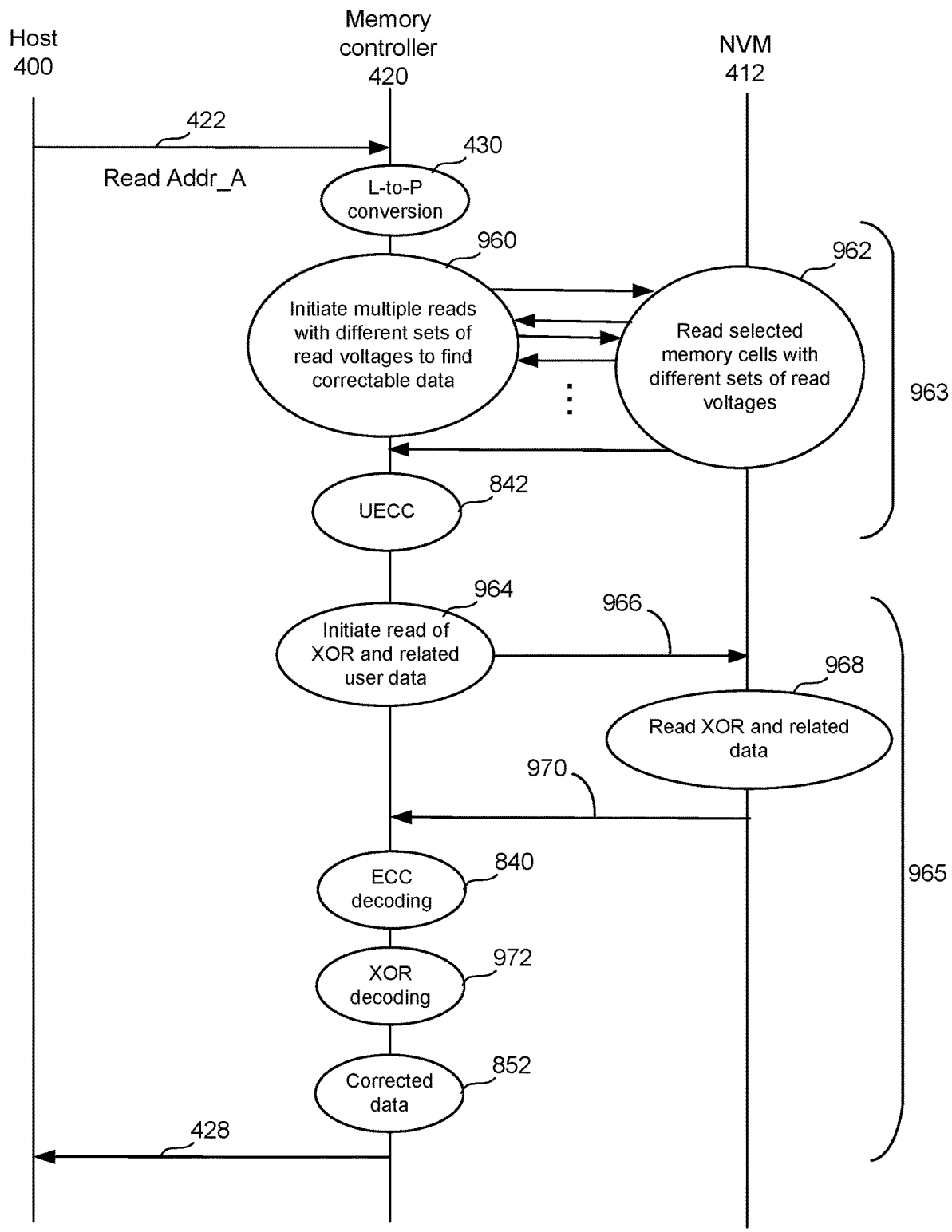
FIG. 9 shows an example of a read operation that includes first recovery using different read voltages and second recovery using XOR.

FIG. 9 shows an example of data recovery using both different read voltages (e.g., as shown in FIGS. 6A-C) and subsequently XOR (e.g., as shown in FIGS. 7A-B). Host 400 sends a host read command 422 indicating an address "Addr_A" to read. In response, memory controller 420 performs logical to physical conversion 430 ("L-to-P conversion") to obtain physical addresses for the requested data as above. Memory controller 420 then initiates multiple reads (e.g., two or more) with different sets of read voltages to find correctable data 960 (e.g., in response to obtaining UECC data, memory controller 420 initiates a subsequent read with a different set of read voltages as illustrated in FIG. 8). In response, memory die 412 reads selected memory cells with two or more different sets of read voltages 962 and returns two or more sets of raw data. When a last read is performed (e.g., last of a predetermined pattern of read voltages or last within a time limit or other constraint) using a last set of read voltages and the last raw data is found to be UECC data 842, first data recovery operation 963 (using different read voltages) ends and second data recovery operation 965 (using XOR) is initiated. Memory controller 420 initiates a read of XOR and related user data 964 (e.g., read of XOR data 756 and portions 750-753) and sends corresponding instructions 966 to memory die 412. Memory die 412 reads the XOR and related data 968 and returns the raw data 970 from these reads. The XOR and related data is subject to ECC decoding 840 to provide corrected data which is then used for XOR decoding 972 (e.g., as shown in FIG. 7B) to provide corrected data 852 (e.g., corrected copy of data found UECC 842). Corrected data 428 is then sent to host 400.

Because the first and second data recovery operations 963, 965 of FIG. 9 include additional steps compared to the recovery technique of FIG. 8, this approach to data recovery may take significant time. While this approach may be useful when there is no time limit for read operations, there may be insufficient time to complete both recovery operations within a time limit for a read, which may limit its use (e.g., there may be sufficient time to allow performance of the first data recovery operation 963 and insufficient time to allow performance of both the first data recovery operation 963 and the second data recovery operation 965). Also, performing XOR operations may require significant latch capacity (e.g., XRAM or DRAM) which may not be available in some memory systems. Some memory systems that are configured as dual-interface or multi-interface memory systems may be configured to perform multiple data recovery techniques (e.g., both different read voltages and XOR as shown in FIG. 9) when configured for one interface (e.g., an interface that does not have a time limit or high time limit for read such as NVMe) but not for another interface (e.g., an interface that has a time limit for read such as SD).

Aspects of the present technology address the technical problem of data recovery when read operations have a time limit. For example, aspects of the present technology include applying two or more data recovery techniques when UECC data is encountered even where using such techniques exceeds the time limit for a read command.

According to an example, control circuits of a memory system may be configured to perform a first data recovery operation (e.g., first data recovery operation 963) in response to reading uncorrectable data from the plurality of nonvolatile memory cells and inform the host, within a time limit for responding to a host read command from the host (e.g., command 422), of the failure of the first data recovery operation and availability of a second data recovery operation (e.g., availability of XOR recovery operation).

Figure 10:
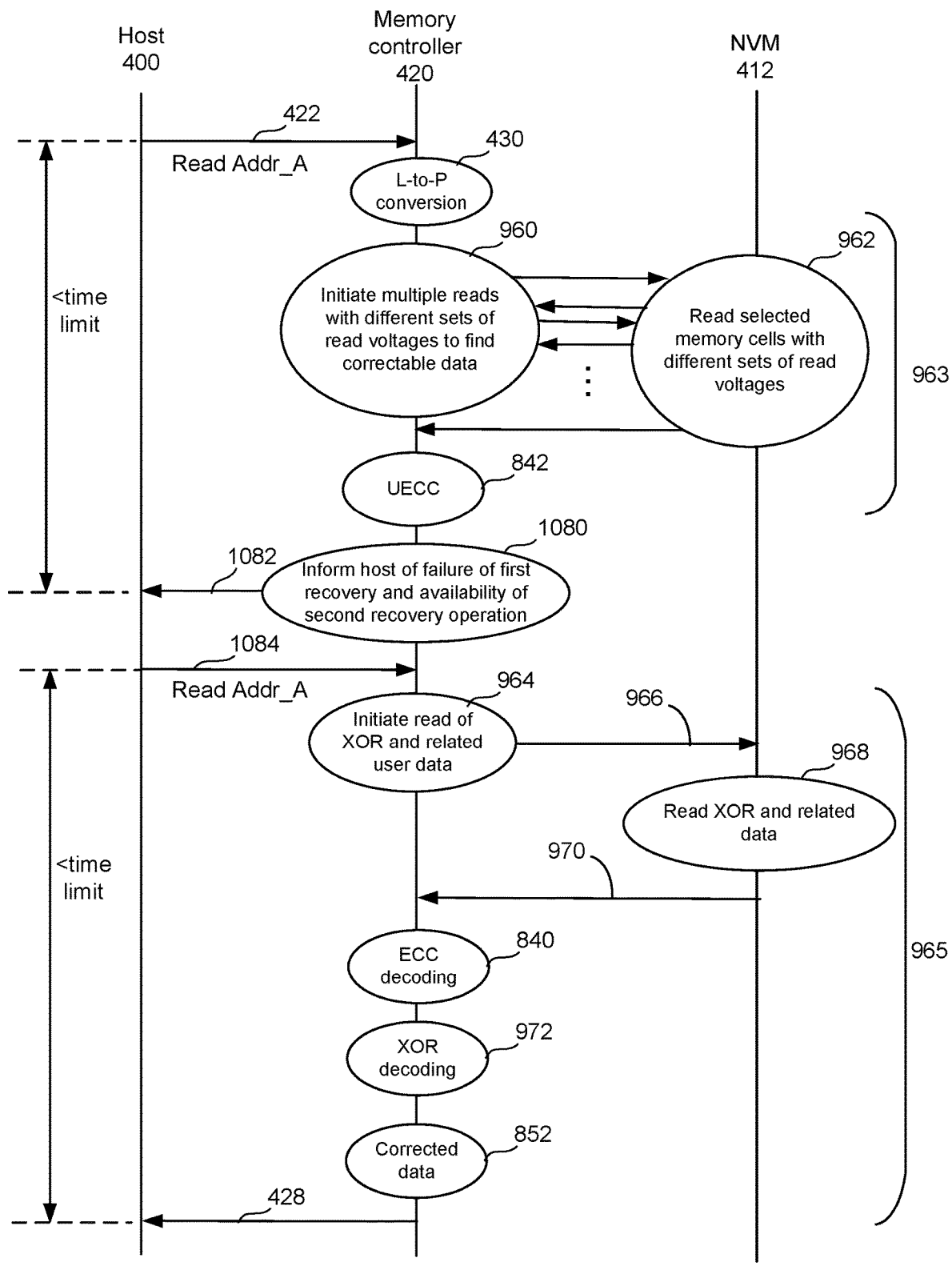
FIG. 10 shows an example of completing a first recovery operation within a time limit for a first read command and completing a second recovery operation within the time limit for a second command.

FIG. 10 illustrates an example of the present technology that includes performing first data recovery operation 963 as previously described without obtaining correctable data (UECC 842). In response to failure of the first data recovery operation 963, memory controller 420 informs the host of failure of the first data recovery operation and availability of a second data recovery operation 1080 and sends a response 1082 to read command 422 within the time limit to convey this information. Host 400 may determine how to deal with the failure of first data recovery operation 963. In the example of FIG. 10, host 400 sends a second read command 1084 for the same data ("Read Addr_A") as command 422. In response to second read command 1084, memory controller 420 initiates second data recovery operation 965, which proceeds as previously described resulting in corrected data 852 and sending of corrected data 428 to host 400 within the time limit from second read command 1084. Note that second data recovery operation 965 is performed in response to second read command 1084 without repeating first data recovery operation 963 between second read command 1084 and second data recovery operation 965 (e.g., first data recovery operation 963 was already found ineffective and the data at Addr_A may be marked accordingly so that a subsequent read command triggers the second data recovery operation 965 and skips first data recovery operation 963). While performing second data recovery operation 965 immediately after first data recovery operation 963, without second read command 1084 could have exceeded the time limit for responding to first read command 422, sending second read command 1084 effectively restarts the clock for the time limit and may allow sufficient time for second data recovery operation 965.

In some cases, second data recovery operation 965 may not be completed within the time limit from second read command 1084. When this occurs, memory controller 420 may pause second data recovery operation 965 and inform host 400 that the second data recovery operation has not completed. In response, host 400 may send another read command for the same data (same address) and in response, memory controller 420 may unpause the second data recovery operation 965 (e.g., resume XOR operations to obtain corrected data.

Figure 11:
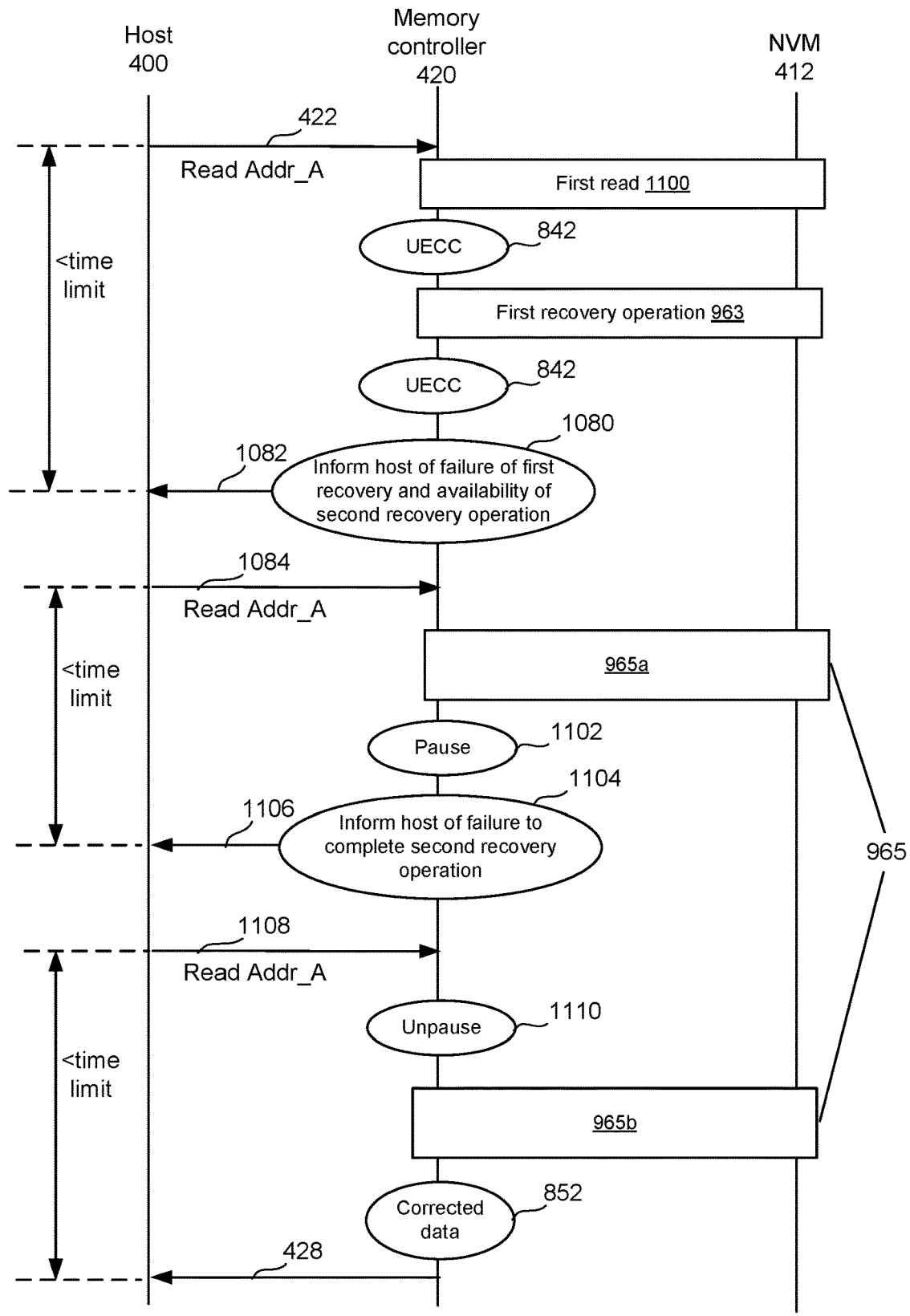
FIG. 11 shows an example that includes pausing and unpausing the second data recovery operation.

FIG. 11 shows an example of data recovery which includes performing a first read 1100 and obtaining UECC data 842. In response, first data recovery operation 963 is performed (e.g., as shown in FIGS. 9-10), which fails to generate correctable data (e.g., UECC data 842). Memory controller 420 informs host of the failure of first data recovery operation 963 and of the availability of a second data recovery operation 1080 within the time limit. In response, host 400 sends a second read command 1084 and second data recovery operation 965 is initiated. Within the time limit from second read command 1084, memory controller 420 may determine that second data recovery operation 965 (e.g., XOR operations) will not be complete by the time limit. Within the time limit, memory controller pauses the second data recovery operation 1102 (at an intermediate stage after completion of a portion 965a of second data recovery operation 965) and informs the host of failure to complete the second data recovery operation 1104 by sending a response 1106 to second read command 1084. Host

400 then sends a third read command 1108 to the same address ("Read Addr_A"). In response, memory controller 420 unpauses 1110 second data recovery operation 965 which continues to completion (second portion 965b of second data recovery operation 965) to provide corrected data 852 and send corrected data 428 to host 400 within the time limit from third read command 1108. In this example, each response to a host read command is sent within the time limit and recovery operations extend over a time that is greater than the time limit (e.g., up to three times the time limit corresponding to three read commands). In other examples, second data recovery operation 965 may be paused and unpaused more than once using additional read commands to provide additional time.

Aspects of the present technology are not limited to the above examples. For example, in some cases, a memory system may perform a read look-ahead operation in which one or more portion of data is read before a host sends a read command for that portion based on a prediction that the host is likely to send a read command for the portion. For example, when a host sends one or more read command directed to sequential addresses, there is a likelihood that the host will request data at one or more subsequent address in the sequence (e.g., if host sends read command(s) for data at addresses A to G, it may be predicted that the host is likely to send read command(s) for data at subsequent address H and in some cases I, J, K and so on). In anticipation of such a host read command, if resources and time allow, a memory system may read the data prior to receiving the command (e.g., read at least address H based on read command(s) directed to addresses A-G). The read ahead data may then be made available for sending to the host rapidly when the read command is received (e.g., buffered or cached in a manner that allows rapid transfer).

Figure 12:
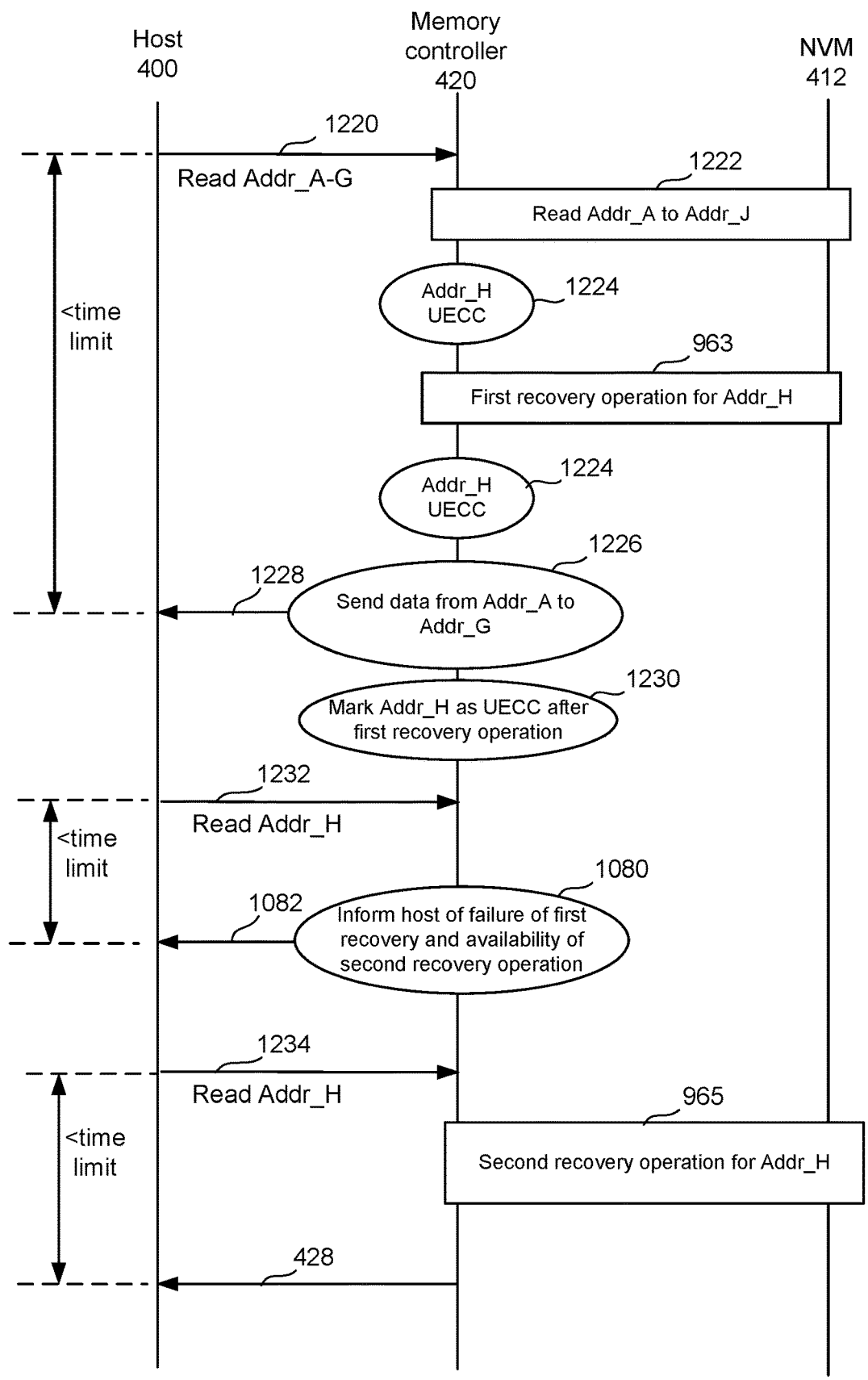
FIG. 12 shows an example of a read operation with read ahead that obtains uncorrectable data.

In an example of the present technology, when such read ahead data is found to be uncorrectable (e.g., after performing a first data recovery operation such as using different sets of read voltages), the data may be marked accordingly to provide a more efficient data recovery. FIG. 12 shows an example in which host 400 sends a read command 1220 directed to addresses A-G. In response, memory controller 420 initiates a read operation 1222 that is directed to addresses A to J (read ahead of addresses H-J) For example, it may be possible to read some or all read ahead data in parallel with the data specified in read command 1220. Data at address H is found UECC 1224 and in response, memory controller 420 initiates first data recovery operation 963 for data at Addr_H (e.g., using different sets of read voltages). Data at address H remains UECC 1224 after first data recovery operation 963. Memory controller 420 sends data from addresses A to G 1226 as a response 1228 to read command 1220 and marks data at address H as UECC after the first data recovery operation 1230 (e.g., unrecoverable using first data recovery operation 963).

Subsequently, when a read command 1232 is received that includes data at address H, instead of repeating the read and first data recovery operation 963 or simply informing the host that the data is UECC, the memory system informs the host that the data has failed a first data recovery operation and indicates availability of a second data recovery operation 1080. This communication may be provided without repeating the first data recovery operation 963 which was already unsuccessful. In response to the information, the host may request the second data recovery operation to be performed (e.g., by sending another read command 1234 directed to address H). In response to read command 1234, memory controller 420 may initiate second data recovery operation 965 for address H without repeating first data recovery operation 963. Memory controller 420 then sends recovered data 428 to host 400. In some cases, when host 400 issues read command 1232, second recovery operation 965 may be initiated in response (e.g., without waiting for read command 1234). This may enable at least partial recovery of data within the time limit for responding to read command 1232. If recovery is not completed when informing the host 1080, second recovery operation 965 may be paused (e.g., similarly to FIG. 11) and response 1082 may include a bit set to indicate availability of second recovery operation. Subsequently, when read command 1234 is received, second recovery operation 965 may be unpaused and may be completed relatively quickly (e.g., because the operation is already partially complete, the remaining time may be relatively short).

A memory system may inform a host regarding recovery operations in any suitable manner according to the protocol in use. Some interface protocols may include suitable ways for a memory system to provide such information. For example, some versions of the SD specification (e.g., version 4.20 onwards) include an Event Indication Mechanism, which may be used for communication (e.g., to inform host of failure of a first recovery and availability of a second data recovery operation 1080). During initialization, a host that is configured appropriately may initialize a memory system to communicate in an appropriate manner. For example, an SD host may discover the memory system capabilities (e.g., whether it supports performance enhancement features such as Event Indication Mechanism) and configure the memory to communicate using the available features (e.g., enabling Event Indication Mechanism and specifically enabling enhanced data recovery). For example, a bit (or bits) may be set in a response to a read command to indicate to the host that the address specified failed a first data recovery operation and that a second data recovery operation is available.

Figure 13:
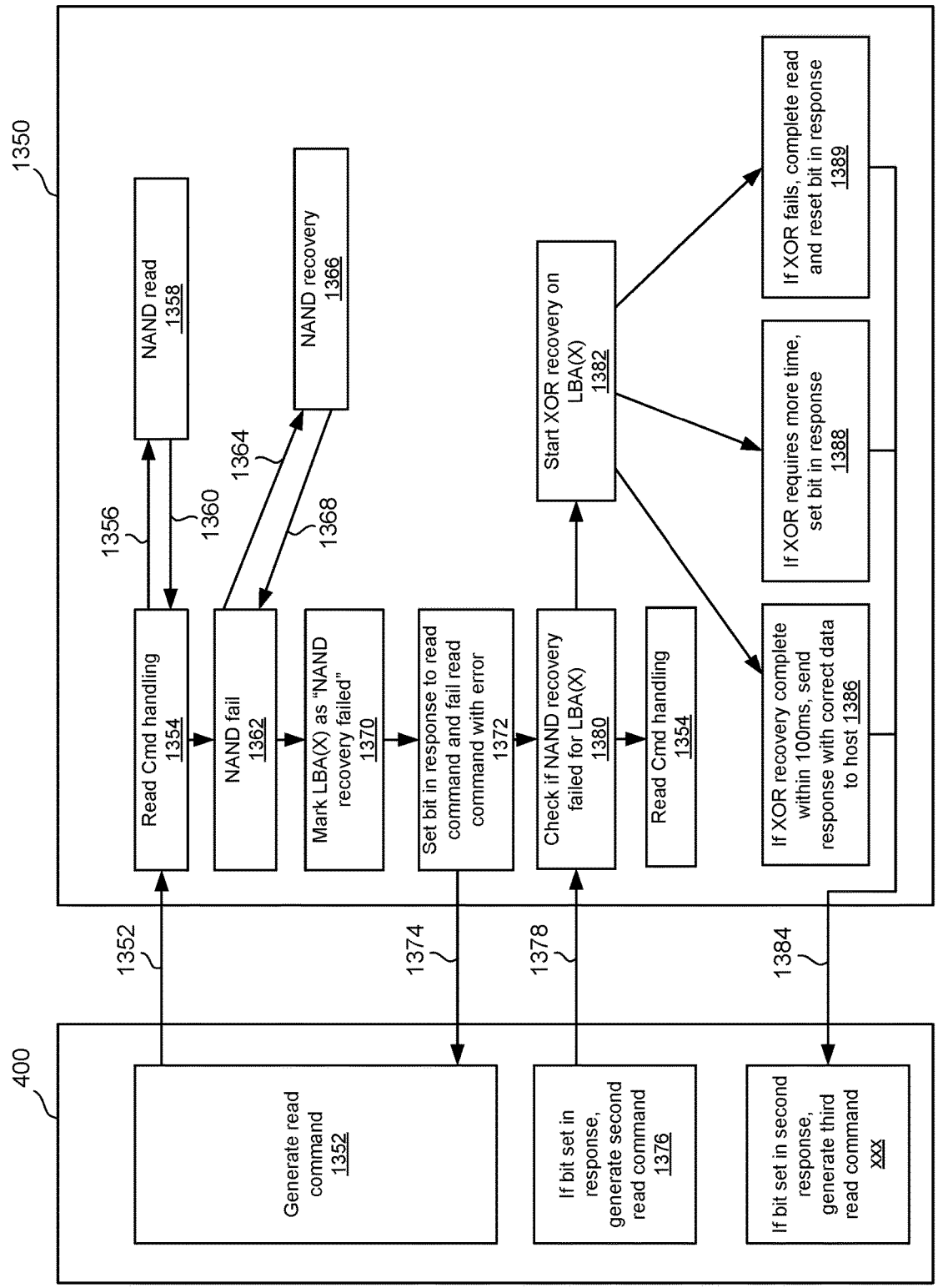
FIG. 13 shows an example that includes first and second data recovery operations.

FIG. 13 illustrates an example of host 400 connected to memory system 1350. Memory system 1350 may include a memory controller (e.g., memory controller 420) and NAND memory (e.g., nonvolatile memory die 412). Host 400 issues a read command 1352 directed to LBA(X). Memory system 1350 initiates read command handling 1354, which includes sending instructions 1356 to perform a NAND read 1358.

When read command handling 1354 receives notification 1360 that NAND read 1358 has failed (e.g., UECC data), it initiates NAND fail 1362, which sends instructions 1364 for NAND recovery 1366, which may include multiple reads using different sets of read voltages. If any NAND read is successful (e.g., NAND read 1358 or any read of NAND recovery 1366), read command 1352 is completed successfully and the corrected data is returned to host 400. In the example of FIG. 13, NAND recovery 1366 is not successful (e.g., correctable data is not obtained using different sets of read voltages).

In response to notification 1368 that NAND recovery 1366 has failed, LBA(X) is marked as "NAND recovery failed" 1370. A bit is set in a response to read command 1352 which indicates a failed read command with error 1372 and the response 1374 is sent to host 400 to indicate failure of the NAND recovery operation 1366 and availability of a second data recovery operation. Memory system 1350 may also record LBA(X) as "NAND recovery failed" (e.g., may set a bit corresponding to LBA(X) accordingly).

Host 400 may processes response 1374 including parsing the bit as "Read can be retried to retrieve the data". When a host and memory system use Event Indication Mechanism of the SD interface standard a bit (e.g., Bit06) may indicate an event to the host, FX_EVENT (Function Extension Event). A memory system can utilize this for multiple functions. If multiple functions utilize this event, the memory system needs to provide information which function generated the event, so that corresponding function driver on the host may handle the event. This may be done through "Function Extension Event Register Set".

If the bit is set in the response, host 400 generates a second read command 1376 (e.g., a second read command to the same address (LBA(X)) indicating a second "Read Recovery" event is triggered) and the second read command 1378 is sent to memory system 1350. Memory system 1350 checks if NAND recovery failed for LBA(X) 1380 (e.g., whether failed bit is set or not). If the failed bit is not set, the memory system initiates read command handling 1354 (e.g., by performing a NAND read).

If the failed bit is set, memory system 1350 starts XOR recovery on LBA(X) 1382. Three outcomes are shown in FIG. 13. If XOR recovery is complete within 100 ms, a response 1384 is sent to the host 1386 with the correct data. If memory system 1350 is unable to complete XOR Recovery within 100 ms (XOR operations need more time) it sends response 1384 indicating an error and setting the bit to inform the host 1388. Memory system 1350 retains the XOR recovery stage at which it had to stop because of the time constraint (e.g., it pauses XOR operations at an intermediate point and remains ready to unpause). Host 400 may parse the bit in response 1384 and retry same read command again (e.g., as shown in FIG. 11). This loop (host sending read commands and memory system unpausing) may continue until XOR recovery completes successfully or fails. If XOR fails, the read is completed with error and the bit is reset in the response 1389 (e.g., any additional data is read and corrected and sent to the host along with an indication of a read fail for the UECC data with the bit reset to indicate no further recovery operation is available). For example, XOR may fail if the XOR data (e.g., XOR data 756) and/or additional user data (e.g., portions 750-753) have a high error rate. Memory system 1350 or control circuits of memory system 1350 (e.g., memory controller 420) may be considered an example of means for informing a host via a host interface, within a time limit for responding to a first host read command directed to the plurality of nonvolatile memory cells, of a failure of a first data recovery operation to obtain Error Correction Code (ECC) correctable data using different read voltages and availability of a second data recovery operation using Exclusive OR (XOR) operations and subsequently performing the XOR operations in response to a second host read command directed to the plurality off nonvolatile memory cells.

If XOR recovery fails, memory system 1350 completes the read by sending response 1384 indicating a failure and resets the bit in the response 1390 (e.g., to avoid additional read commands from host 400).

Figure 14:
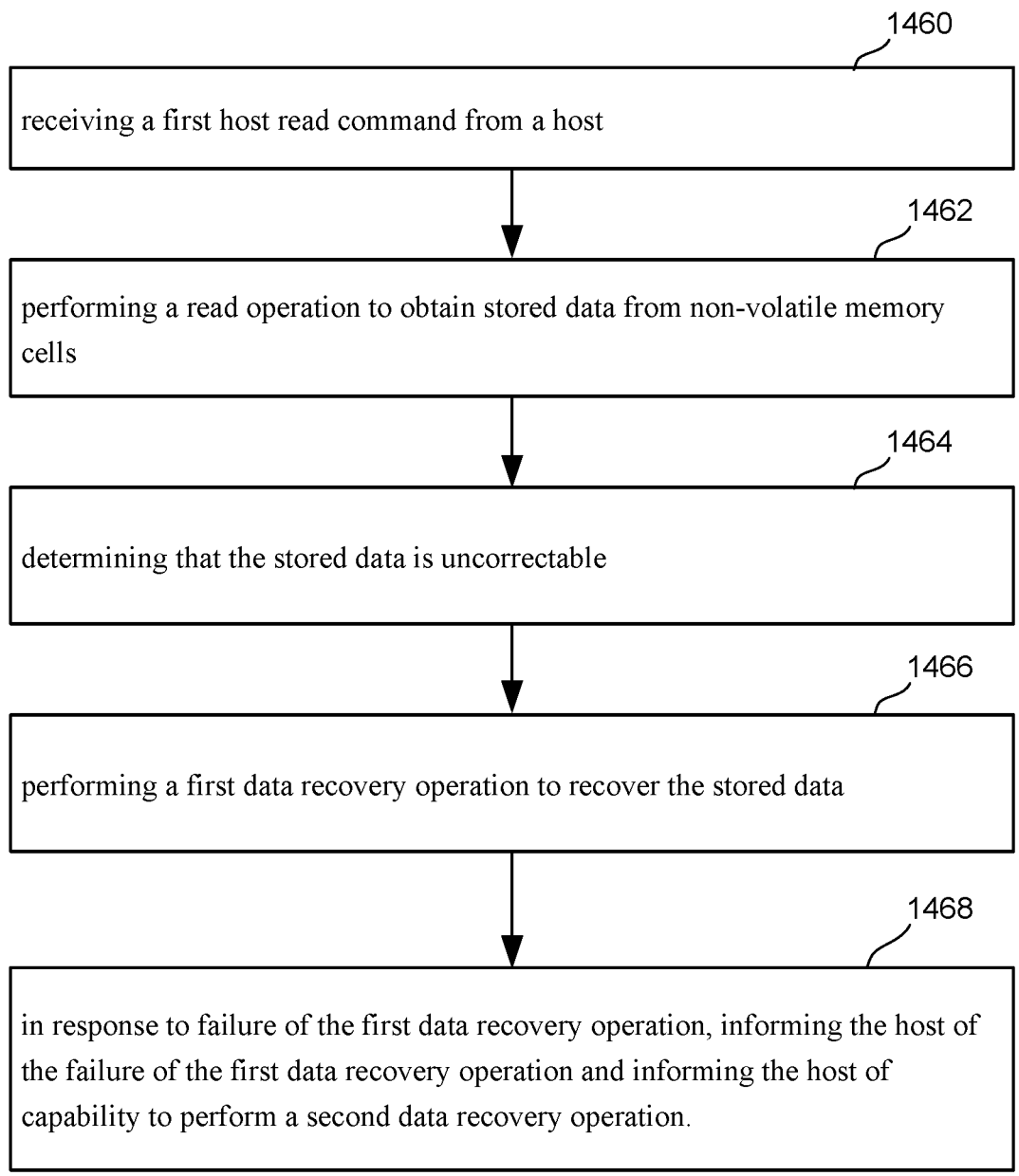
FIG. 14 shows an example that includes informing a host of failure of a first data recovery operation and capability to perform a second data recovery operation.

FIG. 14 shows an example method that implements aspects of the present technology. The method includes receiving a first host read command from a host 1460 and performing a read operation to obtain stored data from non-volatile memory cells 1462. The method further includes determining that the stored data is uncorrectable 1464 (e.g., too many errors for ECC to correct), performing a first data recovery operation to recover the stored data 1466 (e.g., using different read voltages as shown in FIG. 6C) and, in response to failure of the first data recovery operation, informing the host of the failure of the first data recovery operation and informing the host of capability to perform a second data recovery operation 1468 (e.g., by setting one or more bits in a response to the read command).

Figure 15:
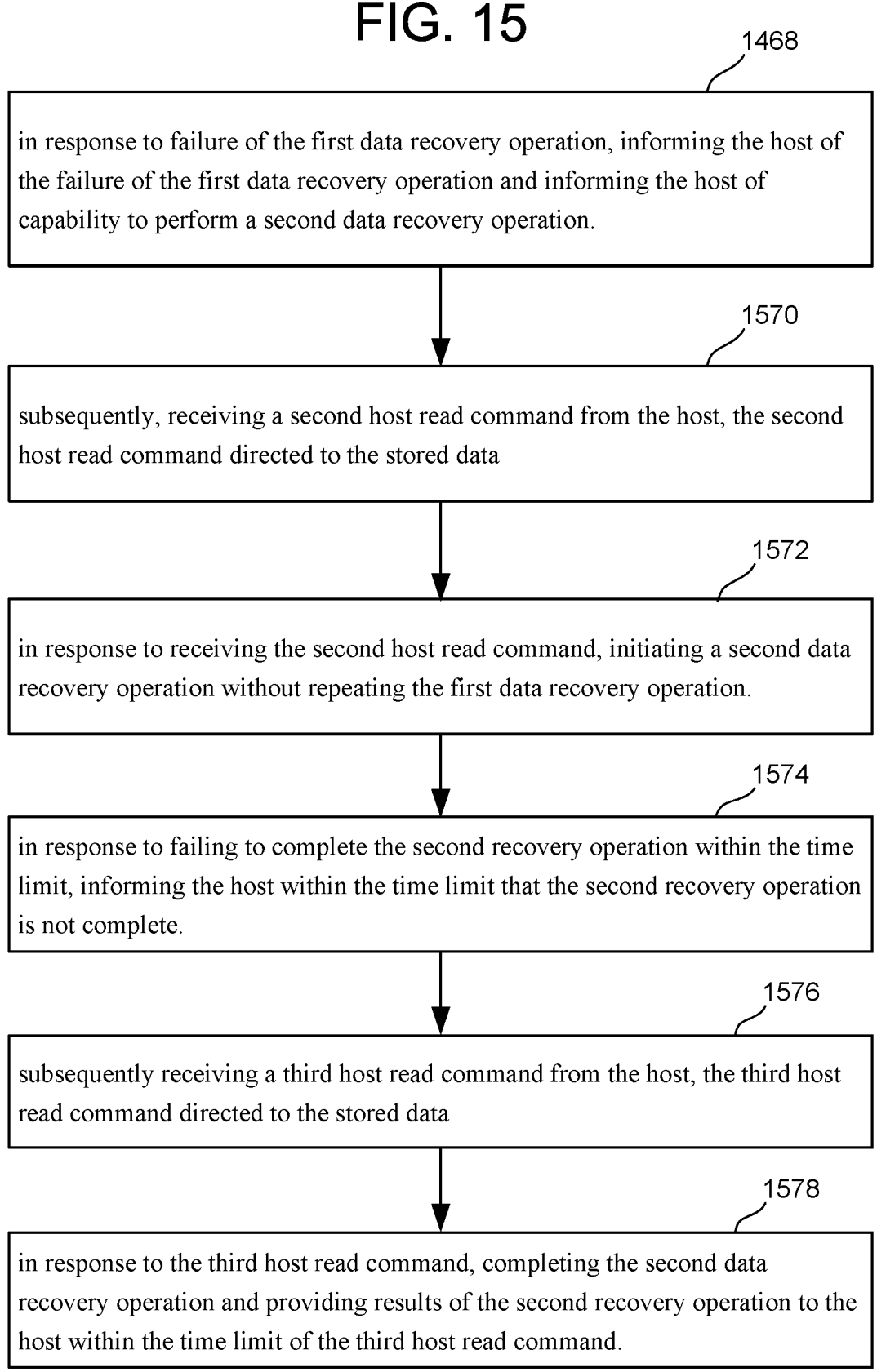
FIG. 15 shows an example that includes recovery operations in response to second and third read commands.

FIG. 15 shows an example method that includes additional possible steps subsequent to informing the host of the failure of the first data recovery operation and informing the host of capability to perform a second data recovery operation 1468. The method includes, subsequently, receiving a second host read command from the host, the second host read command directed to the stored data 1570, in response to receiving the second host read command, initiating a second data recovery operation without repeating the first data recovery operation 1572 (e.g., initiating XOR recovery) and in response to failing to complete the second data recovery operation within the time limit, informing the host within the time limit that the second data recovery operation is not complete 1574. The method further includes subsequently receiving a third host read command from the host, the third host read command directed to the stored data 1576 and in response to the third host read command, completing the second data recovery operation and providing results of the second data recovery operation to the host within the time limit of the third host read command 1578 (e.g., unpausing the paused XOR recovery).

An example apparatus includes one or more control circuits configured to connect to a plurality of nonvolatile memory cells and to a host. The one or more control circuits are configured to perform a first data recovery operation in response to reading uncorrectable data from the plurality of nonvolatile memory cells. The one or more control circuits are further configured to inform the host, within a time limit for responding to a host read command from the host, of a failure of the first data recovery operation and availability of a second data recovery operation.

The one or more control circuits may be configured to perform the first data recovery operation by initiating read operations using two or more different sets of read voltages to obtain two or more sets of raw data from the plurality of nonvolatile memory cells. The one or more control circuits may be further configured to perform the second data recovery operation in response to a subsequent, second read command from the host directed to the plurality of nonvolatile memory cells. The one or more control circuits may be further configured to perform the second data recovery operation by performing an Exclusive OR (XOR) operation on the uncorrectable data in combination with XOR data. The one or more control circuits may be further configured to perform the XOR operation in response to the second read command without repeating the first data recovery operation between the second read command and the XOR operation. The one or more control circuits may be further configured to generate the XOR data prior to writing the plurality of nonvolatile memory cells. The one or more control circuits may be further configured to, in response to failure to complete the XOR operation within the time limit from the second read command, pause the XOR operation at an intermediate stage and inform the host within the time limit of the failure to complete the XOR operation. The one or more control circuits may be further configured to, in response to a subsequent, third read command from the host directed to the plurality of nonvolatile memory cells, unpause the XOR operation. The first data recovery operation may be performed within the time limit and the combined first and second data recovery operations may exceed the time limit.

An example of a method includes receiving a first host read command from a host, performing a read operation to obtain stored data from non-volatile memory cells, determining that the stored data is uncorrectable and performing a first data recovery operation to recover the stored data. The method further includes, in response to failure of the first data recovery operation, informing the host of the failure of the first data recovery operation and informing the host of capability to perform a second data recovery operation.

The method may further include reading the non-volatile memory cells using a first set of read voltages to obtain first raw data, performing Error Correction Code (ECC) decoding of the first raw data, determining that the first raw data is uncorrectable by ECC, reading the non-volatile memory cells using a second set of read voltages to obtain second raw data, performing ECC decoding of the second raw data and determining that the second raw data is uncorrectable by ECC. the first data recovery operation may further include reading the non-volatile memory cells using at least a third set of read voltages to obtain at least third raw data, performing Error Correction Code (ECC) decoding of the at least third raw data; and determining that the at least third raw data is uncorrectable by ECC. The method may further include subsequently, receiving a second host read command from the host, the second host read command directed to the stored data and in response to receiving the second host read command, initiating a second data recovery operation without repeating the first data recovery operation. The second data recovery operation may include performing an Exclusive OR (XOR) operation on raw data from reading the stored data, additional stored data and XOR data stored with the stored data and the additional stored data. Host read commands may be subject to a time limit that provides sufficient time to allow performance of the first data recovery operation and insufficient time to allow performance of the first and second data recovery operations. The method may further include, in response to failing to complete the second data recovery operation within the time limit, informing the host within the time limit that the second data recovery operation is not complete. The method may further include subsequently receiving a third host read command from the host, the third host read command directed to the stored data and in response to the third host read command, completing the second data recovery operation and providing results of the second data recovery operation to the host within the time limit of the third host read command.

An example of a data storage system includes a plurality of nonvolatile memory cells; and means for informing a host via a host interface, within a time limit for responding to a first host read command directed to the plurality of nonvolatile memory cells, of a failure of a first data recovery operation to obtain Error Correction Code (ECC) correctable data using different read voltages and availability of a second data recovery operation using Exclusive OR (XOR) operations and subsequently performing the XOR operations in response to a second host read command directed to the plurality off nonvolatile memory cells.

The host interface may be a Secure Digital (SD) interface and the time limit may be specified by the SD interface specification. The data storage system may be a dual interface data storage system configured to communicate according to the SD interface or the NonVolatile Memory express (NVMe) interface.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the technology and its practical application, to thereby enable others skilled in the art to best utilize the technology in various embodiments and with various modifications as are suited to the particular use contemplated. It is intended that the scope of the technology be defined by the claims appended hereto.

What is claimed is:

1. An apparatus comprising:
one or more control circuits configured to connect to a plurality of nonvolatile memory cells and to a host, the one or more control circuits are configured to:
receive a read command from a host that specifies data to be read and requires a response within a time limit, read the data from the plurality of nonvolatile memory cells in response to the host read command, perform Error Correction Code (ECC) decoding of the data, perform a first data recovery operation in response to a determination that the data is uncorrectable by the ECC decoding, determine that the first data recovery operation failed and inform the host of the failure of the first data recovery operation and availability of a second data recovery operation that is different to the first data recovery operation within the time limit for responding to the host read command by performing the read, the ECC decoding, the first data recovery operation and informing the host within a combined time that is less than the time limit.

2. The apparatus of claim 1, wherein the one or more control circuits are configured to perform the first data recovery operation by initiating read operations using two or more different sets of read voltages to obtain two or more sets of raw data from the plurality of nonvolatile memory cells.

3. The apparatus of claim 2, wherein the one or more control circuits are further configured to perform the second data recovery operation in response to a subsequent, second read command from the host directed to the plurality of nonvolatile memory cells.

4. The apparatus of claim 3, wherein the one or more control circuits are further configured to perform the second data recovery operation by performing an Exclusive OR (XOR) operation on additional data from the plurality of nonvolatile memory cells in combination with XOR data.

5. The apparatus of claim 4, wherein the one or more control circuits are further configured to perform the XOR operation in response to the second read command without repeating the first data recovery operation between the second read command and the XOR operation.

6. The apparatus of claim 4, wherein the one or more control circuits are further configured to generate the XOR data prior to writing the plurality of nonvolatile memory cells.

7. The apparatus of claim 4, wherein the one or more control circuits are further configured to, in response to failure to complete the XOR operation within the time limit from the second read command, pause the XOR operation at an intermediate stage and inform the host within the time limit of the failure to complete the XOR operation.

8. The apparatus of claim 7, wherein the one or more control circuits are further configured to, in response to a subsequent, third read command from the host directed to the plurality of nonvolatile memory cells, unpause the XOR operation.

9. The apparatus of claim 1, wherein the first data recovery operation is performed within the time limit and the combined first and second data recovery operations exceed the time limit.

10. A method comprising:
receiving a first host read command from a host, the first host read command identifies stored data to be read and requires a response to the first host read command within a time limit;
performing a read operation using a first set of read voltages to obtain a first copy of the stored data from the non-volatile memory cells;
determining that the first copy of the stored data that is read from the non-volatile memory cells is uncorrectable by Error Correction Code (ECC);
in response to determining that the first copy of the stored data is uncorrectable by ECC, performing a first data recovery operation to recover the stored data using a second set of read voltages that is different from the first set of read voltages to obtain a second copy of the stored data;
determining that the second copy of the stored data is uncorrectable by ECC; and
in response to failure of the first data recovery operation corresponding to the second copy being uncorrectable by ECC, responding to the first host read command by informing the host of the failure of the first data recovery operation and informing the host of capability to perform a second data recovery operation that is different to the first data recovery operation, a combined time for performing the read operation, determining the first copy is uncorrectable, performing the first data recovery operation, determining that the second copy is uncorrectable and responding to the host is less than the time limit such that responding to the first host read command occurs prior to expiration of the time limit.

11. The method of claim 10, wherein the first data recovery operation includes:
reading the non-volatile memory cells using the first set of read voltages to obtain first raw data;
performing Error Correction Code (ECC) decoding of the first raw data;
determining that the first raw data is uncorrectable by ECC;
reading the non-volatile memory cells using the second set of read voltages to obtain second raw data;
performing ECC decoding of the second raw data; and
determining that the second raw data is uncorrectable by ECC.

12. The method of claim 11, wherein the first data recovery operation further includes:
reading the non-volatile memory cells using at least a third set of read voltages to obtain at least third raw data;
performing Error Correction Code (ECC) decoding of the at least third raw data; and
determining that the at least third raw data is uncorrectable by ECC.

13. The method of claim 10, further comprising:
subsequently, receiving a second host read command from the host, the second host read command directed to the stored data; and
in response to receiving the second host read command, initiating the second data recovery operation that is different from the first data recovery operation.

14. The method of claim 13, wherein the second data recovery operation includes performing an Exclusive OR (XOR) operation on additional stored data and XOR data.

15. The method of claim 13, wherein host read commands are subject to the time limit that provides sufficient time to allow performance of a read operation, ECC correction, the first data recovery operation and responding to the host and provides insufficient time to allow performance of the second data recovery operations in addition to the read operation, ECC correction, the first data recovery operation and responding to the host.

16. The method of claim 15, further comprising, in response to failing to complete the second data recovery operation within the time limit, informing the host within the time limit that the second data recovery operation is not complete.

17. The method of claim 16, further comprising:
subsequently receiving a third host read command from the host, the third host read command directed to the stored data; and
in response to the third host read command, completing the second data recovery operation and providing results of the second data recovery operation to the host within the time limit of the third host read command.

18. An apparatus comprising:
one or more control circuits configured to connect to a plurality of nonvolatile memory cells and to a host, the one or more control circuits are configured to:
receive a first host read command from a host, the first host read command identifies stored data to be read within a time limit, perform a read operation using a first set of read voltages to obtain the stored data from the non-volatile memory cells, determine that the stored data that is read from the non-volatile memory cells is uncorrectable by Error Correction Code (ECC), perform a first data recovery operation to recover the stored data using a second set of read voltages and in response to failure of the first data recovery operation, respond to the first host read command by informing the host of the failure of the first data recovery operation and informing the host of capability to perform a second data recovery operation that includes an XOR operation, the combined time for performing the read operation, determining the stored data is uncorrectable, performing the first data recovery operation and responding to the host being less than the time limit.

19. The apparatus of claim 18, wherein the one or more control circuits include interface circuits that are configured to communicate with the host according to an interface standard and the time limit is a time limit for response to a host read command that is specified by the interface standard.

* * * * *